US011275252B2

(12) United States Patent
Boriskin et al.

(10) Patent No.: US 11,275,252 B2
(45) Date of Patent: Mar. 15, 2022

(54) DEVICE FOR FORMING AT LEAST ONE TILTED FOCUSED BEAM IN THE NEAR ZONE, FROM INCIDENT ELECTROMAGNETIC WAVES

(71) Applicant: InterDigital CE Patent Holdings, Paris (FR)

(72) Inventors: Artem Boriskin, Cesson-Sevigne (FR); Valter Drazic, Cesson-Sevigne (FR); Laurent Blonde, Thorigné-Fouillard (FR)

(73) Assignee: INTERDIGITAL CE PATENT HOLDINGS, Paris (FR)

( * ) Notice: Subject to any disclaimer, the term of this patent is extended or adjusted under 35 U.S.C. 154(b) by 2 days.

(21) Appl. No.: 16/342,036

(22) PCT Filed: Oct. 20, 2017

(86) PCT No.: PCT/EP2017/076877
§ 371 (c)(1),
(2) Date: Apr. 15, 2019

(87) PCT Pub. No.: WO2018/073426
PCT Pub. Date: Apr. 26, 2018

(65) Prior Publication Data
US 2020/0348526 A1     Nov. 5, 2020

(30) Foreign Application Priority Data
Oct. 21, 2016   (EP) .................................... 16306387

(51) Int. Cl.
*G02B 27/09*     (2006.01)
*G02B 27/42*     (2006.01)

(52) U.S. Cl.
CPC ..... *G02B 27/0927* (2013.01); *G02B 27/4233* (2013.01)

(58) Field of Classification Search
CPC .................... G02B 27/0927; G02B 27/4233
(Continued)

(56) References Cited

U.S. PATENT DOCUMENTS

| 3,718,383 | A | 2/1973 | Moore |
| 3,873,408 | A | 3/1975 | Hensler |

(Continued)

FOREIGN PATENT DOCUMENTS

| CN | 1452722 A | 10/2003 |
| CN | 1823456 | 8/2006 |

(Continued)

OTHER PUBLICATIONS

Valentine et al. "An Optical Cloak Made of Dielectrics", Nature Materials Letters vol. 8, July, pp. 568-571 (Apr. 29, 2009).

(Continued)

*Primary Examiner* — Collin X Beatty
(74) *Attorney, Agent, or Firm* — Invention Mine LLC

(57) ABSTRACT

A device for forming at least one focused beam in a near-field zone, from an electromagnetic wave incident on the device, is remarkable in that it comprises at least one layer of dielectric material comprising at least partially at least one cavity, the at least one cavity being filled in with a medium having a refractive index lower than that of the dielectric material. The at least one cavity is targeted to be cylindrical or cone-shaped and comprises at least one base surface, defined with respect to an arrival direction of the electromagnetic wave, and at least one lateral surface. The at least one base surface is delineated by a base edge line which has a shape of a crescent moon, comprising a concave base edge line segment and a convex base edge line segment, which shape, and/or orientation and/or associated base angles between the at least one base surface and the at least one lateral surface control an angular position of a projection (Continued)

Figure 1:
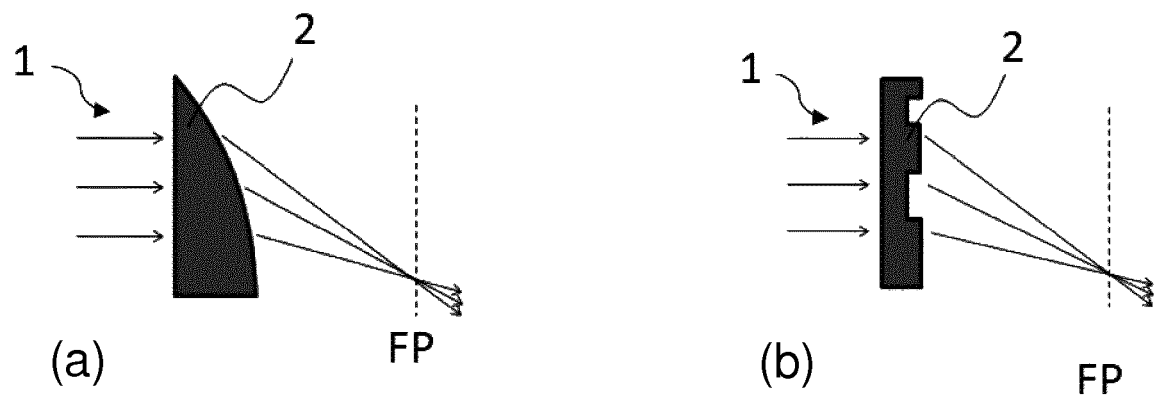
Figure 1:
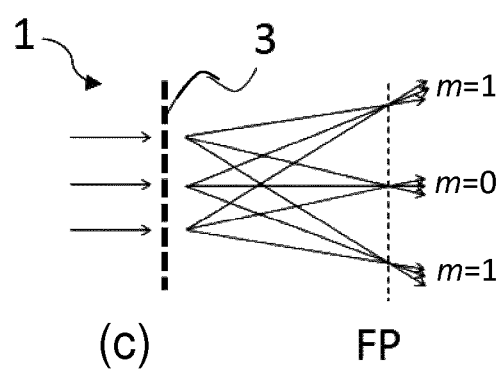
Figure 1:
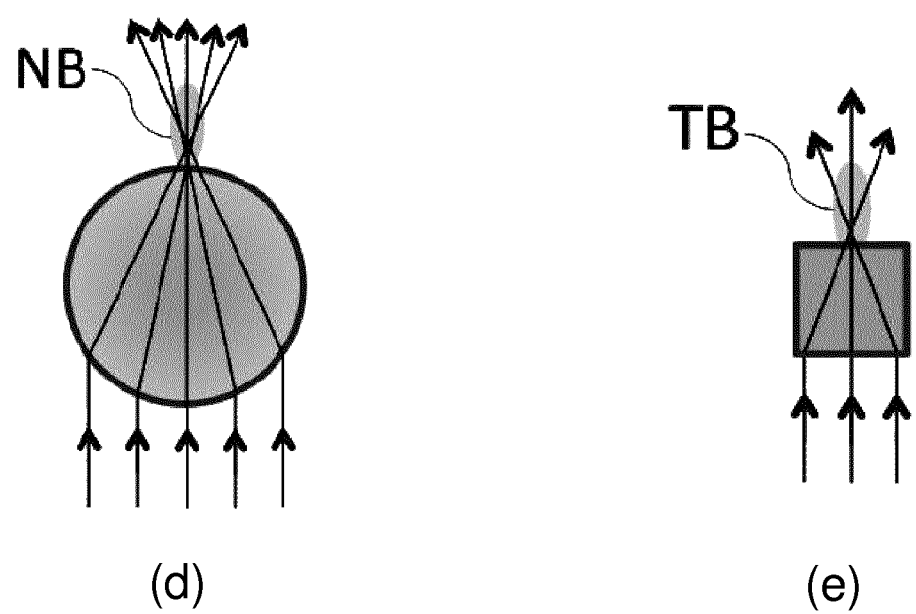

of the at least one focused beam on a plane orthogonal to the arrival direction of the electromagnetic wave and comprising at least part of the at least one base surface, called an azimuth angle.

18 Claims, 13 Drawing Sheets

(58) Field of Classification Search
USPC .................................................. 359/558
See application file for complete search history.

(56) References Cited

U.S. PATENT DOCUMENTS

| | | | |
|---|---|---|---|
| 3,904,268 A | 9/1975 | Keck | |
| 4,952,037 A | 8/1990 | Oikawa | |
| 6,236,513 B1 | 5/2001 | Mallary | |
| 6,569,575 B1 | 5/2003 | Biebuyck | |
| 6,594,430 B1 | 7/2003 | Rausch | |
| 6,753,131 B1 | 6/2004 | Rogers | |
| 6,804,189 B2 | 10/2004 | Inase | |
| 7,057,151 B2 | 6/2006 | Lezec | |
| 7,394,535 B1 | 7/2008 | Chen et al. | |
| 7,541,115 B1 | 6/2009 | Volk | |
| 7,612,883 B2 | 11/2009 | Que | |
| 8,003,965 B2 | 8/2011 | Grbic et al. | |
| 8,052,908 B2 | 11/2011 | Peckerar | |
| 8,448,247 B2 | 5/2013 | Stute | |
| 8,488,247 B2 | 7/2013 | Cai et al. | |
| 8,508,830 B1 | 8/2013 | Wang | |
| 8,552,416 B2 | 10/2013 | Kim et al. | |
| 8,554,031 B2 | 10/2013 | Astratov | |
| 8,953,064 B1 | 2/2015 | Ng et al. | |
| 9,151,891 B2 | 10/2015 | Ma | |
| 9,170,203 B2 | 10/2015 | Bisht | |
| 9,389,424 B1 | 7/2016 | Schowengerdt | |
| 10,677,992 B2 | 6/2020 | Boriskin | |
| 10,678,127 B2 | 6/2020 | Boriskin | |
| 10,846,835 B2 | 11/2020 | Gill | |
| 2003/0036674 A1 | 2/2003 | Bouton | |
| 2004/0165269 A1 | 8/2004 | Hasman | |
| 2008/0024792 A1 | 1/2008 | Pendry et al. | |
| 2008/0089367 A1 | 4/2008 | Srinivasan | |
| 2008/0231863 A1 | 9/2008 | Chen | |
| 2009/0068597 A1 | 3/2009 | Shiraishi | |
| 2010/0006784 A1 | 1/2010 | MacK et al. | |
| 2010/0265590 A1 | 10/2010 | Bowers | |
| 2010/0320213 A1 | 12/2010 | Kelly | |
| 2010/0320513 A1 | 12/2010 | Goarin | |
| 2011/0063717 A1 | 3/2011 | Consonni | |
| 2012/0326309 A1 | 12/2012 | Andry | |
| 2013/0308127 A1 | 11/2013 | Bisht | |
| 2013/0335677 A1 | 12/2013 | You | |
| 2014/0043611 A1 | 2/2014 | Narasimhan | |
| 2014/0111677 A1 | 4/2014 | Fukuda | |
| 2014/0333926 A1 | 11/2014 | Bond | |
| 2015/0090862 A1 | 4/2015 | Matsui | |
| 2015/0146180 A1 | 5/2015 | Lee | |
| 2015/0177619 A1 | 6/2015 | Kobrin | |
| 2015/0212242 A1 | 7/2015 | Chen | |
| 2015/0243096 A1 | 8/2015 | Schowengerdt | |
| 2015/0248790 A1 | 9/2015 | Schowengerdt | |
| 2015/0268415 A1 | 9/2015 | Schowengerdt et al. | |
| 2016/0084761 A1 | 3/2016 | Rothberg | |
| 2016/0147138 A1 | 5/2016 | Shih | |
| 2016/0187788 A1 | 6/2016 | Onose | |
| 2016/0223739 A1 | 8/2016 | Yoon et al. | |
| 2016/0240419 A1 | 8/2016 | Sieber | |
| 2016/0259253 A1 | 9/2016 | Luo | |
| 2016/0265747 A1 | 9/2016 | Nagao et al. | |
| 2016/0298875 A1 | 10/2016 | Dellea | |
| 2018/0210214 A1 | 7/2018 | Kim | |
| 2018/0354844 A1 | 12/2018 | Drazic | |
| 2019/0101700 A1 | 4/2019 | Boriskin | |
| 2019/0101769 A1 | 4/2019 | Boriskin | |
| 2019/0250315 A1 | 8/2019 | Boriskin | |
| 2020/0233223 A1 | 7/2020 | Shramkova | |

FOREIGN PATENT DOCUMENTS

| | | |
|---|---|---|
| CN | 1853131 | 10/2006 |
| CN | 101088040 | 12/2007 |
| CN | 101419337 A | 4/2009 |
| CN | 101819326 | 9/2010 |
| CN | 102916343 A | 2/2013 |
| CN | 103353675 | 10/2013 |
| CN | 105974576 A | 9/2016 |
| EP | 1398656 A1 | 3/2004 |
| EP | 3223062 | 9/2017 |
| EP | 3223063 A1 | 9/2017 |
| JP | 2005141075 A | 6/2005 |
| JP | 2011014857 A | 1/2011 |
| JP | 2011014857 A | 1/2011 |
| KR | 20120111288 | 10/2012 |
| RU | 2591282 C1 | 7/2016 |
| WO | 0157559 A1 | 8/2001 |
| WO | 2003025635 A1 | 3/2003 |
| WO | 2008069454 A1 | 6/2008 |
| WO | 2008080117 A2 | 7/2008 |
| WO | 2010114834 A1 | 10/2010 |
| WO | 2010114857 A1 | 10/2010 |
| WO | 2014182893 A1 | 11/2014 |
| WO | 2017007431 | 1/2017 |
| WO | 2017162880 | 9/2017 |
| WO | 2017162881 | 9/2017 |
| WO | 2017162882 | 9/2017 |
| WO | 2018073407 A1 | 4/2018 |
| WO | 2018073426 A1 | 4/2018 |

OTHER PUBLICATIONS

Viukuwa et al. "A full-color eyewear display using planar waveguides with reflection volume holograms" Journal of the SID, vol. 17, No. 3, pp. 185-193, (May 20, 2008).
Vishiwaki et al. "Efficient colour splitters for high-pixel density image sensors" Nature Photonics, vol. 7, pp. 240-246 (Feb. 3, 2013).
Dang et al. "Red, green and blue lasing enabled by single-exciton gain in colloidal quantum dot films", Nature Nanophotonics Letters, vol. 7, p. 335, (Apr. 29, 2012).
Cai et al. "Optical cloaking with metamaterials", Nature Photonics Letters, vol. 1, pp. 224-227, (Apr. 2, 2007).
Kotylar et al. "Photonic nanojets generated using square-profile microsteps" Applied Optics vol. 53, No. 24 pp. 5322-5329 ( Aug. 12, 2014).
Stafeev et al. "Measurement of photonic nanojet generated by square-profile microstep" Proc. of SPIE vol. 9448 94482C-1 (2014).
Martin et al. "Intense Bessel-like beams arising from pyramid-shaped microtips" Optics Letters vol. 37 No. 7 pp. 1274-1276 (Mar. 30, 2012).
Geints et al. "Modeling spatially localized photonic nanojets from phase diffraction gratings" Journal of Applied physics 119, 153101 (Apr. 18, 2016).
Minin et al. "Localized EM and photonic jets from non-spherical and non-symmetrical dielectric mesoscale objects: Brief review"—Ann. Phys. 1-7(2015) (Jun. 1, 2015).
Heifetz et al "Photonic nanojets" J Comput Theor Nanosci. Sep. 1, 2009; 6(9): 1979-1992 (Sep. 1, 2009).
Alitalo et al. "Electromagnetic cloaking with metamaterials" Materials Today, vol. 12, No. 3 Mar. 2009 pp. 22-29 (Mar. 2009).
Landy et al. "Guiding light with conformal transformations" Optics Express vol. 17, No. 1 Aug. 17, 2009 pp. 14872-14879 (Aug. 6, 2009).
Monticone et al. "Invisibility exposed physical bounds on passive cloaking" Optica vol. 3, Issue 7 pp. 718-724 (Sep. 14, 2016).
Pendry et al. "Controlling electromagnetic fields" Science Express pp. 1-4 (May 25, 2006).

(56) References Cited

OTHER PUBLICATIONS

Schmied et al "Conformal carpet and grating cloaks" Optics Express vol. 18 No. 23 Nov. 8, 2010 pp. 24361-24367 (Nov. 5, 2010).
Pacheco-Pena et al. "Multifrequency focusing and wide angular scanning of terajets" Opt. Lett., vol. 40, No. 2, pp. 245-248, (2015).
Kong et al "Photonic nanojet-enabled optical data storage" Opt. Express, vol. 16, No. 18, Oct. 2008.
Grbic et al "Near-field plates: subdiffraction focusing with patterned surfaces" Science, vol. 320, Issue 5875 Apr. 25, 2008 pp. 511-513, (Apr. 25, 2008).
Novotny et al. "Near-field optical microscopy and spectroscopy with pointed probes" Annu. Rev. Phys. Chem. vol. 57, pp. 303-331, (Dec. 16, 2005).
Guo et al. "Fabrication of optical fiber probes for scanning near-field optical microscopy" mSURJ, vol. 3, No. 1, pp. 32-39 (Mar. 2008).
Pacheco-Pena et al. "Terajets produced by dielectric cuboids" Applied Phys. Lett. vol. 105, 084102, (Aug. 27, 2014).
Liu et al "Geometric effect on photonic nanojet generated by dielectric microcylinders with non-cylindrical cross-sections" Optics Communications 380 (2016) 287-296 (Jun. 17, 2016).
Boriskina "Spectrally engineered photonic molecules as optical sensors with enhanced sensitivity: a proposal and numerical analysis" J. Opt. Soc. Am. B vol. 23, No. 8/Aug. 2006 1565 (Mar. 28, 2006).
Liu et al. "Photonic nanojet modulation by elliptical microcylinders"— Optik 125 (2014) 4043-4046 (Jan. 15, 2014).
Abdul Khaleque et al. "Tailoring the properties of photonic Nanojets by Changing the Material and Geometry of the Concentrator" Progress in Electromagnetics Research Letters, vol. 48, 7-13, 2014 (Aug. 8, 2014).
Mahariq et al. "Photonic Nanojet Analysis by Spectral Element Method", IEEE Photonics Journal, vol. 6, No. 5, 6802714 Oct. 2014 (Oct. 7, 2014).
Geints et al. "Influence of the spatial shape of nonspherical symmetric dielectric microparticles on morphology of photonic jets" Proc. of SPIE vol. 9680 96800V-1 (2015).
Geints et al. "Characteristics of photonic nanojets from ordered microassemblies of dielectric spheres" Quantum Electronics 46 (3) 236-241 (Jan. 15, 2016).
Matsui et al. "Finite-difference time-domain analysis of photonic nanojets from liquid-crystal-containing microcylinder", Japanese Journal of Applied Physics 53, 01AE04 (2014) (Dec. 31, 2013).
Hua et al. "A 3D integral imaging optical seethrough head-mounted display" Opt. Express, vol. 22, 13484, Jun. 2, 2014 (May 28, 2014).
Machine Translations of Patent Publication JP2011014857A, published on Jan. 20, 2011, 34 pages.
International Search Report and Written Opinion of the International Searching Authority for PCT/EP2017/076877, dated Jan. 17, 2018, 11 pages.
International Preliminary Report on Patentability for PCT/EP2017/076877 dated Apr. 23, 2019, 7 pages.
Gu, Yinghong, et. al., "Color Generation Via Subwavelength Plasmonic Nanostructures". Nanoscale, vol. 7, (2015), pp. 6409-6419.
Matsui, Takayuki, et. al., "Transmission Phase Control by Stacked Metal-Dielectric Hole Array With Two-Dimensional Geometric Design". Optical Society of America, Optical Express, vol. 20, No. 14, Jul. 2, 2012, pp. 16092-16103.
International Search Report and Written Opinion of the International Searching Authority for PCT/EP2017/057129 dated May 30, 2017, 12 pages.
International Preliminary Report on Patentability for PCT/EP2017/057129 dated Sep. 25, 2018, 9 pages.
International Search Report and Written Opinion of the International Searching Authority for PCT/EP2017/057131 dated May 30, 2017, 12 pages.
International Preliminary Report on Patentability for PCT/EP2017/057131 dated Sep. 25, 2018, 9 pages.
Ghenuche, Petru, et. al., "Multi-Focus Parallel Detection of Fluorescent Molecules at Picomolar Concentration With Photonic Nanojets Arrays". Applied Physics Letters, American Institute of Physics, (2014), vol. 105, No. 13, pp.131102-1-5.
Kress, Bernard, et. al., "A Review of Head-Mounted Displays (HMD) Technologies and Applications for Consumer Electronics". Proceedings of SPIE, vol. 8720, (2013), pp. 87200A-1-13.
Tirosh, Udi, "New Flat Lenses Technology Could Offer Smaller Lenses With Zero Chromatic Aberration". DIY Photography, Feb. 20, 2015, 8 pages.
Khorasaninejad, Mohammadreza, et. al., "Metalenses: Versatile Multifunctional Photonic Components". Planar Optics, Science, vol. 358, No. 1146, Dec. 1, 2017, pp. 1-8.
Liu , Cheng-Yang, "Photonic Jets Produced by Dielectric Micro Cuboids". Applied Optics, vol. 54, Issue 29, (2015), pp. 8694-8699.
Liu, Cheng-Yang, "Ultra-High Transmission of Photonic Nanojet Induced Modes in Chains of Core-Shell Microcylinders". Physics Letters A, vol. 376, (2012), pp. 3261-3266.
Wei, Pei-Kuen, et. al., "Diffraction-Induced Near-Field Optical Images in Mesoscale Air-Dielectric Structures". Journal of Optical Society of America, vol. 20, No. 7, Jul. 2003, pp. 1503-1507.
Pacheco-Pena, V., et. al., "Terajets Produced by 3D Dielectric Cuboids". Applied Physics Letters vol. 105, No. 8, (2014), pp. 1-12.
International Search Report and Written Opinion of the International Searching Authority for PCT/EP2017/057130, dated Jun. 26, 2017, 11 pages.
International Preliminary Report on Patentability for PCT/EP2017/057130, dated Sep. 25, 2018, 7 pages.
Stafeev, S., et. al., "Near-Field Diffraction of Laser Light by Dielectric Corner Step". Proceedings of SPIE, vol. 9031, (2014), pp. 90311A-1-7.
Huang, Fu Min, et. al., "Nanohole Array as a Lens". Nano Letters, vol. 8, No. 8., (2008), 8 pages.
Junesch, Juliane, et. al., "Optical Properties of Nanohole Arrays in Metal—Dielectric Double Films Prepared by Mask-On-Metal Colloidal Lithography". ACS Nano, vol. 6, No. 11, (2012), pp. 10405-10415.
Minin, Igor V., et. al., "Localized Photonic Jets from Flat, Three-Dimensional Dielectric Cuboids in the Reflection Mode". Optics Letters, vol. 40, No. 10, May 15, 2015, pp. 2329-2332.
Wikipedia, "Diffraction". Wikipedia web article retrieved from the Internet on May 16, 2017, pp. 1-14.
Liu, Cheng-Yang, "Ultra-Elongated Photonic Nanojets Generated by a Graded-Index Microellipsoid". Progress in Electromagnetics Research Letters, vol. 37, (2013), pp. 153-165.
Royon, Arnaud, "Nonlinear Femtosecond Near Infrared Laser Structuring in Oxide Glasses". Electronic Theses and Dissertations, (2009), 174 pages.
Sinai, P., "Correction of Optical Aberrations by Neutron Irradiation". Applied Optics, vol. 10, Issue 1, Jan. 1971, pp. 99-104.
Machine translation of RU 2591282 C1 published on Jul. 20, 2016, 5 pages.
Liu, Cheng-Yang, et. al., "Engineering Photonic Nanojets by Core-Shell Micro-Cuboids". IEEE Proceedings of the 16th International Conference on Nanotechnology, Aug. 22-25, 2016, pp. 113-115.
Kong, Soon-Cheol, et. al., "Quasi One-Dimensional Light Beam Generated by a Graded-Index Microsphere". Optical Society of America, Optics Express, vol. 17, No. 5, Mar. 2, 2009, pp. 3722-3731.
International Preliminary Report on Patentability for PCT/EP2017/076881 dated Apr. 23, 2019, 6 pages.
International Search Report and Written Opinion of the International Searching Authority for PCT/EP2017/076881 dated Feb. 2, 2018, 10 pages.
Venugopal, Gunasekaran, et. al., "Advances in Micro/Nano Electromechanical Systems and Fabrication Technologies". Chapter 8, entitled "Nanolithography", Intech Press, (2013), pp. 187-205.
Xie, X.N., et. al., "Nanoscale Materials Patterning and Engineering by Atomic Force Microscopy Nanolithography". Materials Science and Engineering R54, (2006), pp. 1-48.
Wu, Wei, et. al., "A Deep Sub-Wavelength Process for the Formation of Highly Uniform Arrays of Nanoholes and Nanopillars". Nanotechnology, vol. 18, 485302, (2007), pp. 1-4.

(56) References Cited

OTHER PUBLICATIONS

Cheung, Chin Li, et. al., "Fabrication of Nanopillars by Nanosphere Lithography". Nanotechnology, vol. 17, No. 5, Mar. 14, 2006, pp. 1339-1343.
Xu, Chen, et. al., "Photon Nanojet Lens: Design, Fabrication and Characterization". Nanotechnology, vol. 27, Mar. 4, 2016.
Mohseni, Hooman, "Photonic Jet and its Applications in Nano-Photonics". Frontiers in Optics/Laser Science (2015), 2 pages.
Voison, Pauline, "New Generation Lithography by UV-Assisted Nanoimprint: Study and Development of Materials and Processes for Microelectronic Application". Abstract of PhD Thesis, Universete Joseph Fourier, (2007), 173 pages.
Kim, Jooyoung, et al., "Fabrication of Palsmonic Nanodiscs by Photonic Nanojet Lithography". Applied Physics Express, vol. 5, 025201, Jan. 19, 2012, pp. 025201-1-3.
Kushwaha, P.K., et al., "Controlled Shaping of Photonic Nanaojets Using Core Shell Microspheres". International Conference on Optics and Photonics, Proceedings of SPIE, vol. 9654, (2015), pp. 96541H-1-6.
Timoschenko, Igor, "Scanning Nanaojet Lithograph and Microscope". Photonics Applications in Astronomy, Communications, Industry, and High-Energy Physics Experiments, Proceedings of SPIE vol. 6937, 69373R (2007), pp. 69373R-1-5.
Valentine, Jason, et. al., "An Optical Cloak Made of Dielectrics". Nature Materials Letters, vol. 8, No. 7 Jul. 2009, pp. 568-571.
Dang, Cuong, et. al, "Red, Green and Blue Lasing Enabled by Single-Exciton Gain in Colloidal Quantom Dot Films". Nature Nanotechnology Letters, vol. 7., May 2012, pp. 335.
Cai, Wenshan, et. al., "Optical Cloaking With Metamaterials". Nature Photonics, vol. 1, No. 4, Apr. 2007, 224-227.
Stafeev, Sergey S., et. al., "Measurement of Photonic Nanojet Generated by Square-Profile Microstep". Proceedings of SPIE, vol. 9448, (2015), p. 94482C-1-5.
Alitalo, Pekka, et. al., "Electromagnetic Cloaking With Metamaterials". Materials Today, vol. 12, No. 3, Mar. 2009, pp. 22-29.
Landy, Nathan I., et. al., "Guiding Light With Conformal Transformations". Optical Society of America, Optics Express, vol. 17, No. 17, Aug. 17, 2009, pp. 14872-14879.
Monticone, Francesco, et. al., "Invisibility Exposed: Physical Bounds on Passive Cloaking". Optical Society of America, Optica, vol. 3, No. 7, Jul. 2016, pp. 718-724.
Pendry, J. B., et. al., "Controlling Electromagnetic Fields". Science, vol. 312, Jun. 23, 2006, pp. 1780-1782.
Schmied, Roman, et. al., "Conformal Carpet and Grating Cloaks". Optical Society of America, Optics Express, vol. 18, No. 23, Nov. 8, 2010, pp. 24361-24367.
Matsui, Tatsunosuke, et. al., "Finite-Difference Time-Domain Analysis of Photonic Nanojets From Liquid-Crystal-Containing Microcylinder". Japanese Journal of Applied Physics 53, 01AE04, (2014), pp. 1-4.
Mahariq , Ibrahim, et. al., "Photonic Nanojet Analysis by Spectral Element Method". IEEE Photonics Journal, vol. 6, No. 5, Oct. 2014, 15 pages.
Geints, Yurii E., et. al., "Influence of the Spatial Shape of Nonspherical Symmetric Dielectric Microparticles on Morphology of Photonic Jets". Proceedings of SPIE, vol. 9680, (2015) pp. 1-5.
Geints, Yu E., et. al., "Characteristics of Photonic Nanojets From Ordered Microassemblies of Dielectric Spheres". Quantum Electronics, vol. 46, No. 3, (2016), pp. 236-241.
Martin, Jérôme, et. al., "Intense Bessel-Like Beams Arising From Pyramid-Shaped Microtips". Optical Society of America, Optical Letters, vol. 37, No. 7, Apr. 1, 2012, pp. 1274-1276.
Gients, Yu, E., et. al., "Modeling Spatially Localized Photonic Nanojets From Phase Diffraction Gratings". Journal of Applied Physics, 119, 153101, (2016), 6 pages.
International Search Report and Written Opinion of the International Searching Authority for PCT/EP2017/076835, dated Jan. 23, 2018, 19 pages.
International Preliminary Report on Patentability for PCT/EP2017/076835 dated Apr. 23, 2019, 10 pages.
Valdi Via-Valero, F. J., et al. "Optical forces on cylinders near subwavelength slits illuminated by a photonic nanojet." Optics Communications 294 (2013): 25 pages.
Kuang, C., et al., "Creating attoliter detection vol. by microsphere photonic nanojet and fluorescence depletion." Optics Communications 285, No. 4 (2012): 402-406 (5 pages).
Zhao, T., et al., "Nanofocusing Element Based on Subwavelength Optical Microcavity" Opto-Electronic Engineering, vol. 37 no. 4, Apr. 2010, pp. 147-150 (4 pages).
Neves, A. A. R., "Photonic nanojets in optical tweezers." Journal of Quantitative Spectroscopy and Radiative Transfer 162, Mar. 17, 2015, 20 pages.
Ghenuche, P., et al., "Photonic nanojet focusing for hollow-core photonic crystal fiber probes." Applied optics vol. 51, No. 36 (2012) pp. 8637-8640 (4 pages).
Geints, Y.E., et al., "Photonic jet shaping of mesoscale dielectric spherical particles: Resonant and non-resonant jet formation " Journal of Quantitative Spectroscopy and Radiative Transfer 126, Sep. 2013 pp. 44-49 (6 pages).
Matsui, Takayuki, et al., "Transmission Phase Control By Stacked Metal-Dielectric Hole Array With Two-Dimensional Seometric Design". Optical Society of America, Optical Express, vol. 20, No. 14, Jul. 2, 2012, pp. 16092-16103 (12 pages).
Definition—Light (https://www.britannica.com/science/light, accessed online Oct. 21, 2021) 2021 (38 pages).
J. H. Schmid et al., "Refractive Index Engineering With Subwavelength Gratings in Silicon Microphotonic Waveguides," EEE Photonics Journal, vol. 3, No. 3, Jun. 2011, pp. 597-607.

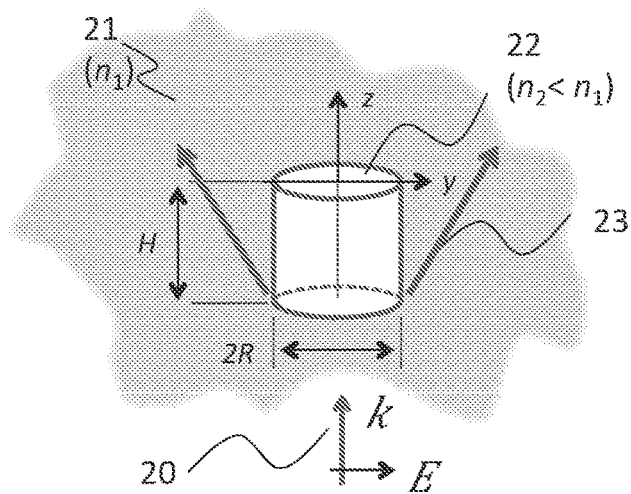
Figure 2(a)
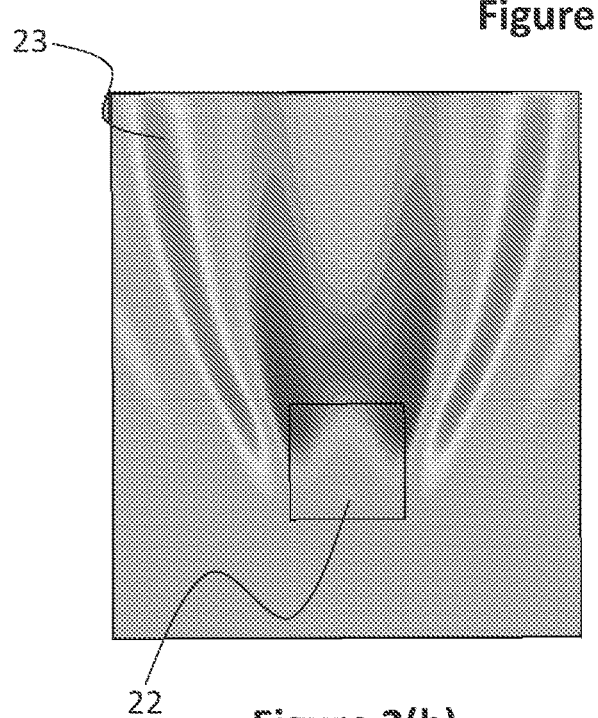 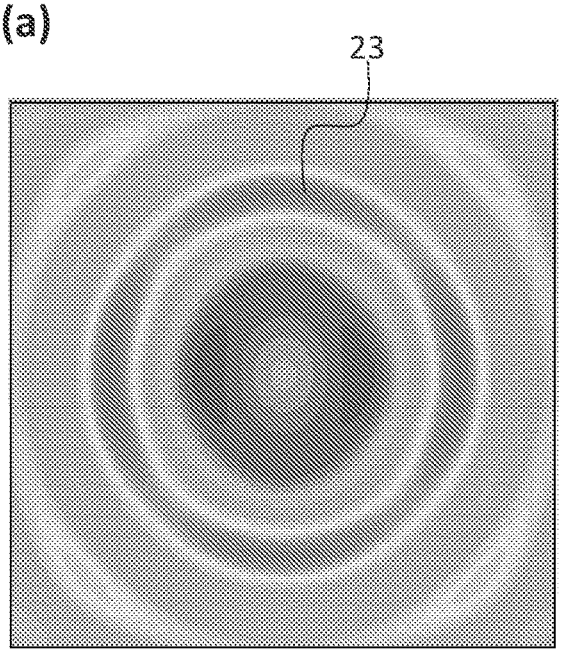
Figure 2(b)　　　　　　　　Figure 2(c)

Figure 3A
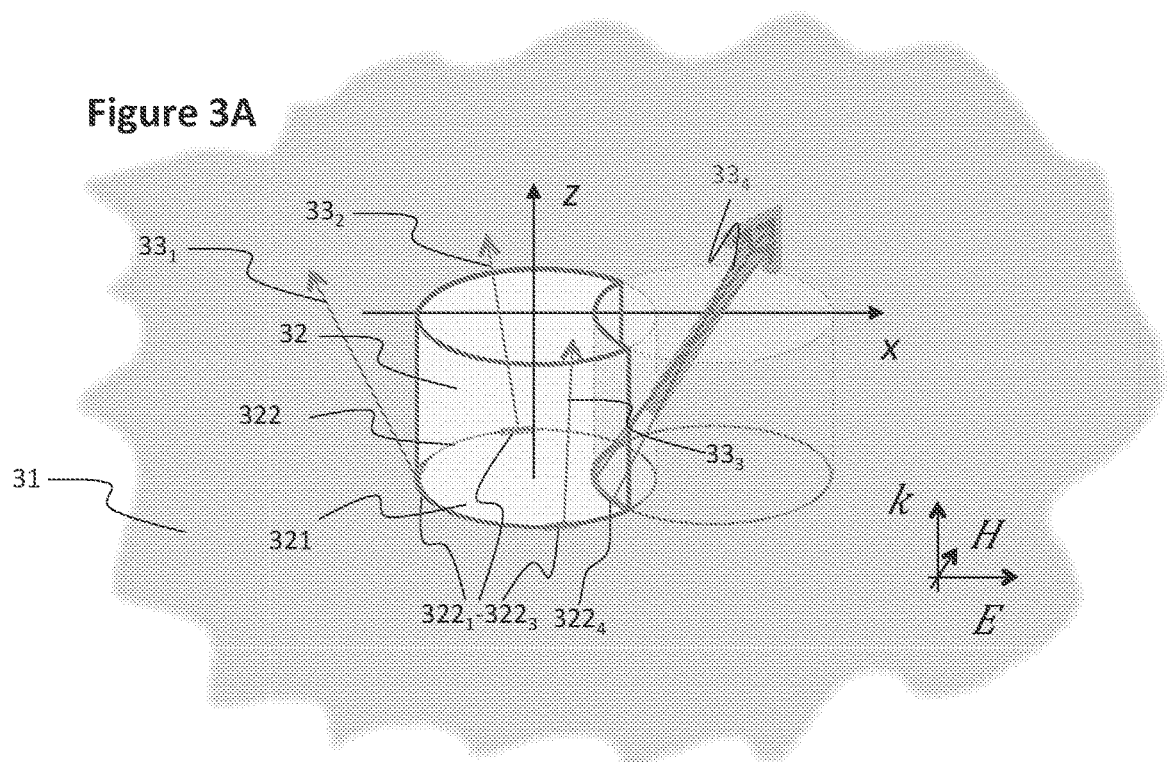
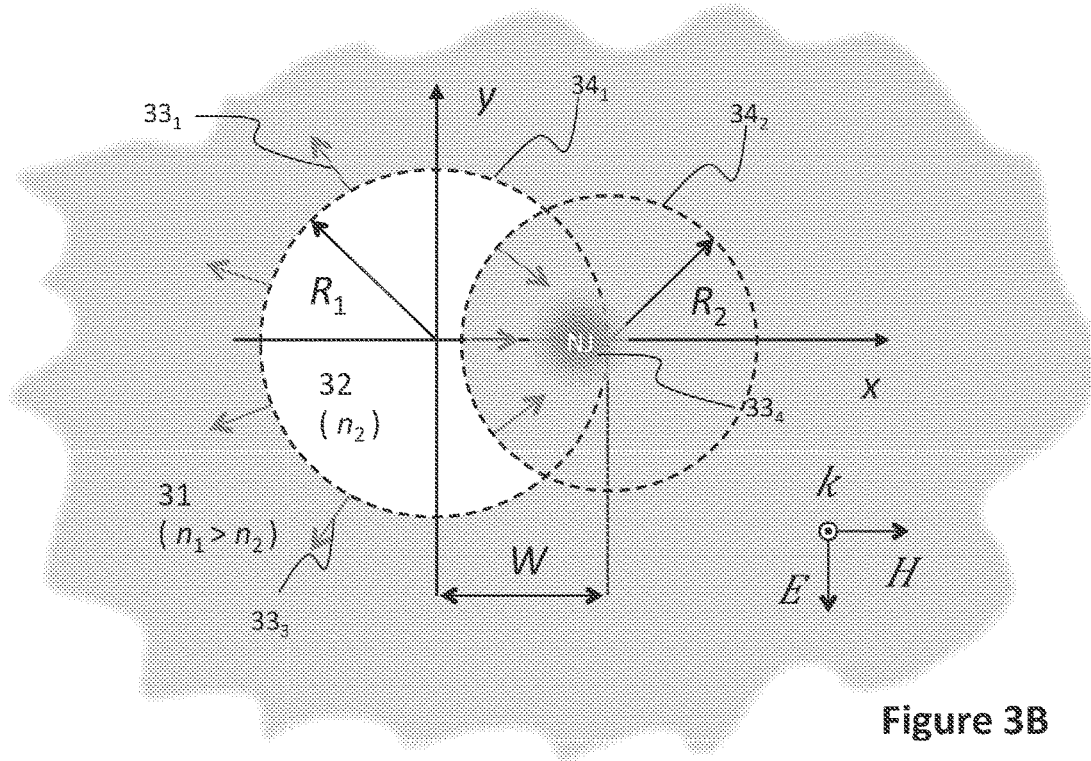
Figure 3B

DEVICE FOR FORMING AT LEAST ONE TILTED FOCUSED BEAM IN THE NEAR ZONE, FROM INCIDENT ELECTROMAGNETIC WAVES

This application claims the benefit, under 35 U.S.C. § 365 of International Application PCT/EP2017/076,877, filed Oct. 20, 2017, which was published in accordance with PCT Article 21(2) on Apr. 26, 2018, in English and which further claims the benefit of priority application EP16306387.8, filed on Oct. 21, 2016.

1. TECHNICAL FIELD

The present disclosure relates generally to techniques for forming field intensity patterns from electromagnetic waves, among which visible light. More particularly, but not exclusively, the present disclosure relates to techniques for near-field focusing and beam forming in the near zone, that can be used in a wide range of devices (as for example displays, including eyewear electronic devices and head-mounted displays for AR (Augmented Reality) and VR (Virtual Reality) glasses, optical sensors for photo/video/light field cameras, bio/chemical sensors, including lab-on-chip sensors, microscopy, spectroscopy and metrology systems, etc.).

By near zone, it is meant here, and throughout this document, a region around a device according to the present disclosure, whose dimensions can extend from a fraction of the wavelength to about 10 wavelengths in the host medium. It may not obviously be limited to the non-radiative (reactive) zone but can also comprise the Fresnel radiative, the transition, and partly the far-field zones, depending on the size of the device.

2. BACKGROUND

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

In the following, a problematic described in the context of focusing and beam forming in the near zone is presented. However, the present technique can also be used in a wider context of guiding electromagnetic waves.

The focusing and collimation (i.e. beam forming) of electromagnetic waves is an established way to increase locally the magnitude of the electric field and, in such a way, to enhance efficiency of sensors, e.g. electro-optical sensors whose operational principles rely on the conversion of the energy propagating in space in the form of an electromagnetic wave into an output voltage or current. The latter sensors (for instance CMOS imaging sensors or photodiodes) are in the heart of the devices produced by Lytro, Raytrix, and Nokia as explained in document U.S. Pat. No. 8,953,064. The same phenomenon of the local field enhancement is used in a variety of other applications at different wavelength ranges.

In the optical field, the today level of technologies enables fabrication of highly-integrated components (e.g. chips and optical sensors) with structural elements having nano-scale dimensions, which are close to or even smaller than the wavelength of visible light (see for example the article "*A full-color eyewear display using planar waveguides with reflection volume holograms*" by H. Mukawa et al., published in the proceedings of SID, vol. 17, no. 3, pp. 185-193, 2009, or the article "*Efficient colour splitters for high-pixel density image sensors*" by S. Nishiwaki et al., published in Nature Photonics, vol.7, pp. 240-246, 2013, or in the document US 2014/0111677, or in the article "*A 3D integral imaging optical see-through head-mounted display*" by H. Hua and B. Javadi, published in Opt. Express, vol. 22, 13484, 2014). The possibility of manipulating light with the same level of accuracy would become a great breakthrough compared to the state of the art.

The spatial resolution of conventional focusing devices, such as dielectric and metal-dielectric lenses, is limited by the Abbe diffraction limit and typically does not exceed one wavelength in the host media. At the same time, there are many applications which require, or can benefit from, a sub-wavelength resolution (see for example the article "*Photonic nanojets*", by A. Heifetz et al., and published in the Journal of Computational Theory Nanoscience, vol. 6, pp. 1979-1992, 2009). This explains the growing interest to the focusing components enabling the sub-wavelength resolution.

Another critical challenge associated with the today mobile and wearable technologies consists in the need for further miniaturization of such devices. The operational principles of the conventional lenses prevent reduction of their dimensions beyond a certain limit (~10 wavelengths) that constitutes a bottleneck for the future advances in the field.

In particular, such a constraint may concern the packaging density of light detectors and may thus handicap further improvement of the image resolution.

Finally, the operational principles of the conventional lenses require a certain index ratio between the lens and host medium materials. The higher the index ratio, the higher the lens focusing power can be achieved. Because of this, in most cases the lenses are separated by air gaps, which require additional space and cause certain difficulties with lens fixation in space and alignment. Fully integrated system can help avoid these problems (see the previous mentioned article "*Efficient colour splitters for high-pixel density image sensors*").

However, combination of several dielectric materials with different refractive indexes is rather difficult and not always feasible because of both the technological difficulties and the limited range of the refractive index variation for the optically-transparent materials (typical index value in optical range is n<2). Thus, alternative design concepts are needed.

Another issue, which arises with focusing devices, lies in the control of the elevation and azimuth angles of the focused beam. Actually, controlling the beam direction is of utmost interest for a number of applications requiring precise near-field patterning and/or deviation of an incident electromagnetic wave (e.g. visible light) propagation direction.

There are a number of optical devices, which comprise components enabling light focusing and deviating functions. Among those are digital image sensors used in various photo/video cameras, optical combiners used in Augmented Reality/Virtual Reality glasses, and light guiding systems, which are the essential part of various light capturing and light processing devices.

In principle, these two functions can be separated and implemented using two (or more) independent components, like mirrors and prisms (for deviation) and refractive or diffractive lenses (for focusing). This approach provides an accurate control over the shape of the wave front of the incident and transmitted waves but may require precise alignments of the independent components, which may cause certain difficulties with fabrication and assembly of the device.

There are also some components, which are able to perform both focusing and deviating functions simultaneously, such as asymmetric refractive lenses (see FIG. 1 (a)), asymmetric diffractive lenses (see FIG. 1 (b)), and diffractive gratings ((see FIG. 1 (c)).

Devices embedding asymmetric refractive lenses (see FIG. 1 (a)) rely on the phase delay experienced by the rays propagating through a dielectric material 2 with a refractive index $n_2$ higher than that ($n_1$) of the host medium 1. The transmitted rays focus in the focal plane FP. The optical power of such a component depends on the refractive index ratio at the boundaries of the lens, as well as on the curvature of its convex surface. Its effectiveness depends on the size, surface quality, and fabrication tolerance of the lens surfaces. The required fabrication accuracy can be achieved quite easily for large-size lenses, which dimensions are much larger than the wavelength (which is typical for optical applications). On the opposite, manufacturing asymmetric microlenses having wavelength-scale dimensions (which is typical for nano-photonic applications) is difficult, because the curvilinear shape of the lens profile is not always compatible with established micro- and nano-fabrication techniques. The use of refractive lenses in integrated focusing systems may also face certain difficulties because its operational principle requires a host medium 1 with a refractive index $n_1$ lower that that of the lens material 2, e.g. air. This may cause certain difficulties with fixation of the lenses in space and their alignment with respect to other focusing elements.

Devices embedding asymmetric diffractive lenses (see FIG. 1 (b)) rely on the diffraction phenomenon. In particular, such lenses may take the form of a zoned dielectric plate with variable groove width, which can be optimized to provide a desired optical power and light deviation angle. The light deviating function is implemented by breaking the symmetry of the structure, similarly as in the case of asymmetric refractive lenses. Diffractive lenses have a planar technology that fits well both optical and nano-photonic applications. It is also compatible with established micro- and nano-scale fabrication techniques, such as photolithography. However, diffractive lenses intrinsically suffer from strong chromatic aberration that may not be acceptable for some applications.

Finally, a tilted focused beam can be generated by a diffraction grating 3 (see FIG. 1 (c)). Such a grating can be implemented in the form of periodic grooves or strips, which period defines the light deviation angles observed for the first and higher diffraction orders. Such gratings are easy to implement, which makes them attractive for both optical and photonic applications. However, like diffractive lenses, they intrinsically suffer from chromatic aberrations. Moreover, the gratings always give rise to multiple beams associated with different diffraction orders, which may not be acceptable for some applications.

Moreover, as already mentioned above, an additional weakness of the devices of FIG. 1 is that the spatial resolution of such far-field focusing systems is limited by the Abbe diffraction limit set by $\sim\lambda/2n \sin \alpha$, where $\lambda$ is the vacuum wavelength, n is the host media refractive index, and $\alpha$ is the half aperture angle of the lens. Thus, a higher resolution can be achieved either by increasing the lens aperture size or by reducing the focusing distance. The latter explains the growing interest to near-field focusing systems. This interest is also strongly supported by the growing number of applications across different domains, which require near-field light processing with the highest possible resolution, and notably sub-wavelength resolution (see for example the previous mentioned article "*Photonic nanojets*").

At present, there are several near-field focusing techniques available, based on subwavelength aperture probes (see the article "*Near-field optical microscopy and spectroscopy with pointed probes*", by L. Novotny and S. J. Stranick, published in the Annu. Rev. Phys. Chem. Vol. 57, pp. 303-331, 2006 or the article "*Fabrication of optical fiber probes for scanning near-field optical microscopy*", by S. Y. Guo, J. M. LeDue, P. Grüter, and published in mSURJ, vol. 3, no. 1, 2008.), planar subwavelength-patterned structures (see the document U.S. Pat. No. 8,003,965 or the article "*Near-field plates: subdiffraction focusing with patterned surfaces*" by A. Grbic, L. Jiang and R. Merlin, published in Science, vol. 320, pp. 511-513, 2008), and photonic nanojet microsphere dielectric lenses (see the article "*Photonic nanojet-enabled optical data storage*" by S.-C. Kong et al., published in Opt. Express, Vol. 16, No. 18, 2008, or the document U.S. Pat. No. 7,394,535, (illustrated in FIG. 1(d)) or the previously mentioned article "Photonic nanojets"). The latter solution (i.e. nanojet microspheres (FIG. 1(d))) is often referred to as the most effective one because microspheres can simultaneously provide the subwavelength resolution and a high level of field intensity enhancement (also noted FIE). As shown on FIG. 1(d), they allow generating a nanojet beam NB.

Despite attractive performance characteristics, the use of microspheres is associated with certain difficulties related to their (i) precise positioning, (ii) integration with other optical components, and (iii) non-compatibility with the established planar fabrication techniques. These difficulties affect feasibility and increase the fabrication and assembly costs of the nanojet based devices. Potentially, the assembly problem can be solved using nanoscale patterned structures or hollow tubing (see the document U.S. Pat. No. 8,554,031), but these solutions may not be compatible with some applications.

An alternative solution for nanojet microsphere lenses was proposed based on the solid dielectric cuboids (noted SDC). As demonstrated in the article "*Terajets produced by dielectric cuboids*" by V. Pacheco-Pena et al., published in Applied Phys. Lett. vol. 105, 084102, 2014 (and illustrated by FIG. 1(e)), or in the article "*Multifrequency focusing and wide angular scanning of terajets*" by V. Pacheco-Pena et al., published in Opt. Lett., vol. 40, no. 2, pp. 245-248, 2015, when illuminated by a plane wave, the SDC lenses can also produce condensed beams TB, similar to the nanojet beams observed for microspheres, with subwavelength dimensions, provided the size and shape of cuboids is properly adjusted with respect to the incident wavelength and the refractive index of the cuboid material. According to the previously mentioned article "*Terajets produced by dielectric cuboids*", the best spatial resolution ($\lambda/2$, where $\lambda$ is the wavelength in the host medium) and field intensity enhancement (factor of ~10) is achieved for SDC with dimensions of about one wavelength in the host medium and the refractive index ratio $n_2/n_1 \sim 1.5$, where $n_1$ and $n_2$ are refractive indexes of the host medium and cuboid material, respectively.

Although the rectangular shape of SDC lenses can be advantageous for some planar fabrication methods (e.g. micromachining or lithography), the fabrication of SDC lenses operating in the optical range can be difficult or even impossible because of the following constraints:

Strict requirements imposed on the cuboid size and shape;

Absence of materials with the desired refractive indexes (in the optical range, the refractive index of common optical glass and plastics, which can be used as a host medium, varies from $n_1 \approx 1.3$ up to 2.0, whereas, according to the article "*Terajets produced by dielectric cuboids*", the desired value of the cuboid lens refractive index should be $n_2 \sim 2.25$ (follows from the suggested ratio $n_1/n_2=1.5$ and the refractive index value of a standard glass $n_1 \approx 1.5$) that is out of range for standard optical materials;

No solution provided for setting the position of such lenses in space. This is a critical point because of the miniature size of the cuboids.

Moreover, for the time being, such near-field focusing components enabling the sub-wavelength resolution, do not allow producing the required light deviation function. As shown on FIGS. 1(*d*) and 1(*e*), where the arrows schematically show formation of nanojet beams when such components are illuminated by a plane wave from below, and where the elongated "jet-like" shape corresponds to the focal region, such components produce nanojet beams, which axis nearly coincides with the incident wave propagation direction.

Based on the above, it can be concluded that there is no reliable solution for providing simultaneously focusing and light deviation functions, while achieving sub-wavelength resolution and providing a simple topology compatible with established micro- and nano-fabrication techniques.

It would hence be desirable to provide a technique enabling control over the field intensity distribution in the near zone, and notably for focusing electromagnetic waves and beam forming in the near zone, which would not suffer from these drawbacks, and which would allow controlling the deviation of the focused beam.

3. SUMMARY

References in the specification to "one embodiment", "an embodiment", "an example embodiment", indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The present disclosure is directed to a device for forming at least one tilted focused beam in a near zone, from an electromagnetic wave incident on said device.

Such a device is remarkable in that it comprises at least one layer of dielectric material comprising at least partially at least one cavity, said at least one cavity being filled in with a medium having a refractive index lower than that of said dielectric material. Moreover, said at least one cavity comprises at least one base surface, defined with respect to an arrival direction of said electromagnetic wave, and at least one lateral surface. Said at least one base surface is delineated by a base edge line which comprises at least two opposite base edge line segments comprising at least one concave base edge line segment and at least one convex base edge line segment, which shape and/or orientation and/or associated base angles between said at least one base surface and said at least one lateral surface control an angular position of a projection of said at least one focused beam in a plane orthogonal to said arrival direction of said electromagnetic wave and comprising at least part of said at least one base surface, called an azimuth angle.

The tilted focused beam is formed thanks to a recombination of nanojet beams originating from different portions of the concave base edge line, and a direction of the tilted focused beam is different from a direction of the incident electromagnetic wave.

Hence, the present disclosure provides a new type of device for forming desired field intensity distribution in the near zone, with the aid of purely dielectric microstructures. More precisely, such devices are remarkable in that they provide simultaneously focusing and light deviation functions. In other words, they allow focusing electromagnetic waves and generating condensed low-dispersive optical beams (so-called nanojets) in the near zone from a plane electromagnetic wave incident on the device; they also allow controlling the azimuth angle of such nanojets, thanks to an appropriate choice of the parameters of the device's structure, namely the length and curvature of the concave and convex segments of the base edge line, as well as the base angles between the base and lateral surfaces of the cavity. Actually, the lateral surface of the cavity need not necessarily be vertical, and may show an angle with respect to the normal to the surface of the dielectric layer.

By base edge line, it is meant here, and throughout the present document, both an actual base edge line, in case the bottom surface forms an angle with the lateral surface of the cavity, and a shadow, or imaginary, base edge line, in case there is a burr or a passing between the bottom surface and the lateral surface of the cavity, with a smooth rounded transition between both.

The plane in which the azimuth angle is defined is a horizontal plane comprising the base surface of the cavity, in case the electromagnetic wave is incident normal to the base surface, and the base surface forms an angle with the lateral surface of the cavity. More generally, such a plane is orthogonal to the arrival direction of the incident EM wave, and substantially tangent to the base surface, in case the transition between the base surface and the lateral surface of the cavity is not sharp but somehow rounded.

There is no restriction on the bottom surface of the dielectric layer, which may be plane, or not. The dielectric layer may notably be flexible.

The medium filling the cavity may simply be air, another gas, vacuum, a liquid or any other material with a refractive index lower than that of the dielectric material.

According to an embodiment of the present disclosure, a ratio between said refractive index of said medium filling said at least one cavity and said refractive index of said dielectric material contributes to controlling an angular position of a projection of said at least one focused beam in a vertical plane, called an elevation angle.

Such an elevation angle not only depends on the ratio of refractive indexes, but also on the base angle of the cavity. It may also be influenced by the size/shape of the concave segment of the cavity's base surface edge line.

Hence, such a device allows controlling both the azimuth and elevation angles of the focused beam, thus achieving a complete control of the electromagnetic wave deviation, which makes it very attractive for many nano-photonic applications.

According to another embodiment, said at least one cavity is targeted to be cylindrical or cone-shaped (i.e. said at least one cavity is approximately cylindrical or cone-shaped) and said base edge line has a shape of a crescent moon, comprising a concave base edge line segment and a convex base edge line segment.

By cylindrical cavity, it is meant here, and throughout this document, a cavity which shape is a generalized cylinder, i.e. a surface created by projecting a closed two-dimensional curve along an axis intersecting the plane of the curve. In other words, such a cylinder is not limited to a right circular cylinder but covers any type of cylinder, notably, but not exclusively, a cuboid or a prism for example. The cavity may also have the form of a cone. Its main axis may be orthogonal to the surface of the bottom of the cavity, or be tilted. Due to the fabrication tolerance, the cavities may also have imperfect shapes, and it must be understood, for example, that cavities targeted to be shaped as cylinders, may become cone-shaped cavities during the manufacturing process.

Hence, the cavity may have the shape of a hollow cylinder with a crescent moon cross section. The base edge line of such a cavity comprises two line segments adjacent to the convex and concave surfaces of the cylindrical cavity. In this configuration, the convex segment of the base edge line produces a wide diverging beam of a conical type, while the concave segment of the base edge line acts like a focusing element producing a focused nanojet beam that is formed thanks to the recombination of the nanojet beams originating from different portions of the concave segment of the base edge line.

Such a cavity with a crescent moon cross section is easy to manufacture through established microfabrication techniques (like molding (e.g. nanoimprinting) or photolithography) by superimposing (i.e. subtracting) two circular cylinders.

According to a further embodiment, said at least one cavity belongs to at least one set of at least two cavities.

Cavities may be arranged into arrays of cavities, or non-regular arrangements forming a peculiar pattern, in order to generate specific focused beams in the near zone, or an array of beams, which deviation may be controlled. Moreover, the arrays of cavities may be planar (with all base faces of all cavities lying in the same plane) or not, and can be made of identical cavities or not. Notably, the microstructure may comprise any number of cavities arranged in one plane (i.e. at a surface of a single plate) and placed far enough from each other to avoid electromagnetic coupling (i.e. at least a few wavelengths in the host medium). Thanks to this, each microcavity produces an independent nanojet beam, which parameters (Full Width at Half Maximum (FWHM) and deviation angle) depend on the parameters of the corresponding microcavity.

According to yet a further embodiment, said cavities in said set are at least partly merged to form at least one arrangement of cavities.

For example, cavities may be combined to form a periodic S-type curved groove, or a gear-type cavity formed by merging several cavities with a crescent moon shape. Such a gear may have different radii of concave segments or may only have two or three identical or non-identical concave segments.

According to an embodiment, a device according to the present disclosure may also comprise several gear-type cavities, whether identical or not, rotated in horizontal plane. It may also comprise an arrangement of S-type grooves, whether of identical or non-identical shape, i.e. with a varying radius of concave segments. For example, such a device may comprise a first S-type curved groove with all identical segments of radius R1, a second S-type curved groove of all identical segments of radius R2, a third S-type curved groove of all identical segments of radius R3, etc. In an alternate embodiment, it may also comprise one or several S-type curved grooves, with radius of the concave segments varying along the groove.

Hence, the shape of the cavity can be generalized towards a more complex structure comprising a set of crescent moon elements combined together. Such a structure can be designed to produce a more complex optical function, as well as for gaining additional degrees of freedom for near-field patterning and/or for simplifying the fabrication/assembly process.

According to an embodiment, such a device further comprises at least one layer forming a substrate abutting said at least one layer of dielectric material.

Such a substrate may contribute to the mechanical rigidity of the device.

According to a further embodiment, such a device further comprises at least one layer forming a superstrate, said at least one layer of dielectric material being located between said substrate and said superstrate.

Hence, the device may take the form of a planar optically-transparent element, comprising two glass or plastic plates (namely the substrate and the superstrate), between which a dielectric material with void or filled hollow microcavities is embedded. The superstrate may of course be non-planar, and follow the shape of the substrate for example. Actually, the pattern of the field intensity distribution generated by the device when illuminated by a plane wave incident normal to the base solely depends on the cavity base angle (or step angle), on the cavity cross-section shape, and on the index ratio between the dielectric material and the medium filling the cavity (or covering the lower part of the surface with respect to the step).

It must be noted that the radiation of the beams will change for incline incidence of the plane wave, with a shape of the beam well preserved for the incident angles of about +1/−30°, depending on the size, base angle and curvature of the cavity base edge line.

According to a further embodiment, said substrate and said superstrate are made of the same dielectric material as said at least one layer of dielectric material.

According to yet a further embodiment, said dielectric material forming said at least one layer of dielectric material belongs to the group comprising:
  glass;
  plastic;
  a polymer material, such as PMMA (Poly(methyl methacrylate)) or PDMS (Polydimethylsiloxane);
  an organic or inorganic optically transparent electrically conducting material (such as indium tin oxide (ITO) or doped zinc oxide (ZnO) for example);
  ceramics.

In these dielectric materials, no plasmonic effect can occur.

It must be noted that air is not considered as a candidate dielectric material for the device according to the present disclosure.

Such a device can hence be fabricated using standard dielectric materials, which are easy to find and inexpensive.

According to an embodiment, a material of said superstrate belongs to the group comprising:
  glass;
  plastic;
  a polymer material;

an organic or inorganic optically transparent electrically conducting material (such as indium tin oxide (ITO) or doped zinc oxide (ZnO) for example);
a semiconductor material;
a liquid;
a gas;
a gel.

According to an embodiment, a material of said substrate belongs to the group comprising:
glass;
plastic;
a polymer material;
an organic or inorganic optically transparent electrically conducting material (such as indium tin oxide (ITO) or doped zinc oxide (ZnO) for example);
a semiconductor material;
a liquid;
a gas;
a gel.

Hence, no plasmonic effect can occur in said superstrate.

According to an embodiment, the medium having a refractive index lower than that of said dielectric material belongs to the group comprising:
glass;
plastic;
a liquid;
a gas;
a gel.

It is to be understood that both the foregoing general description and the following detailed description are exemplary and explanatory and are not restrictive of the invention, as claimed.

4. BRIEF DESCRIPTION OF THE DRAWINGS

Figure 5A:
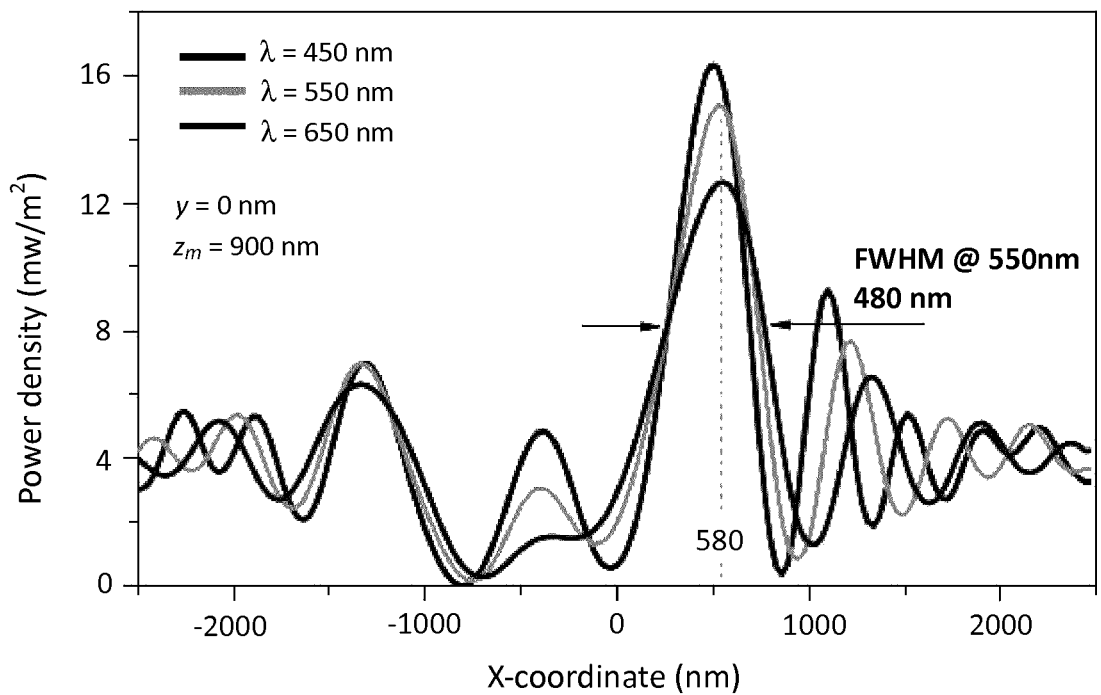
Figure 5B:
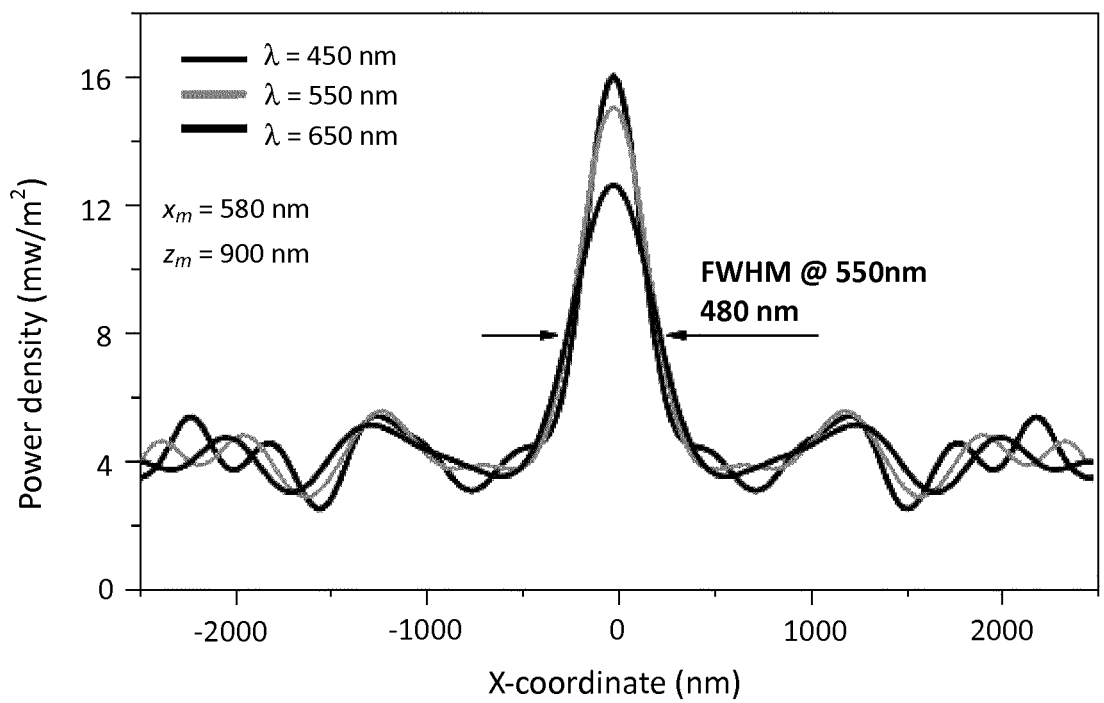
Figure 6:
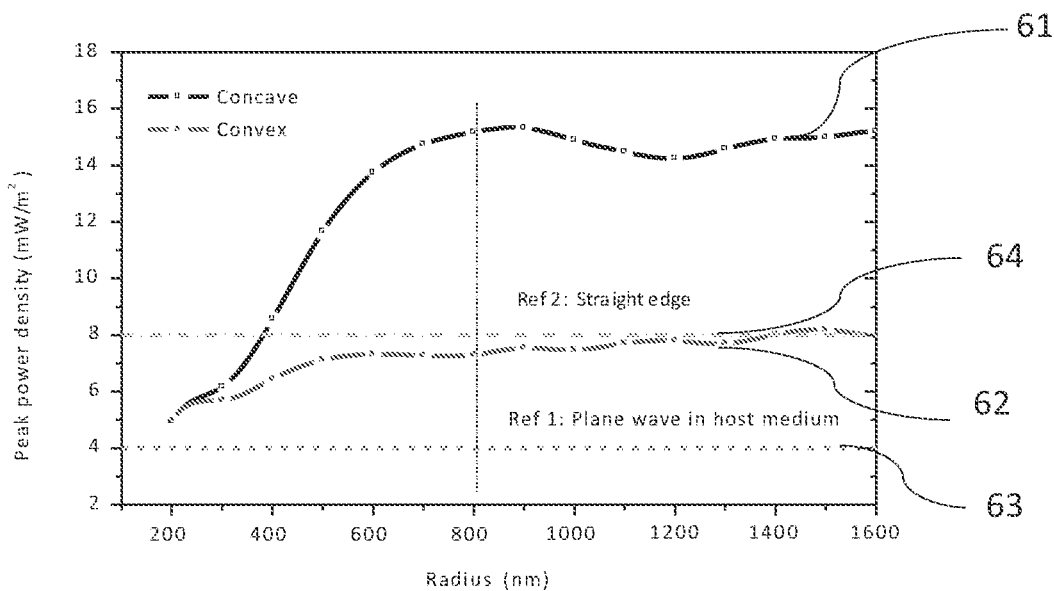
Figure 7:
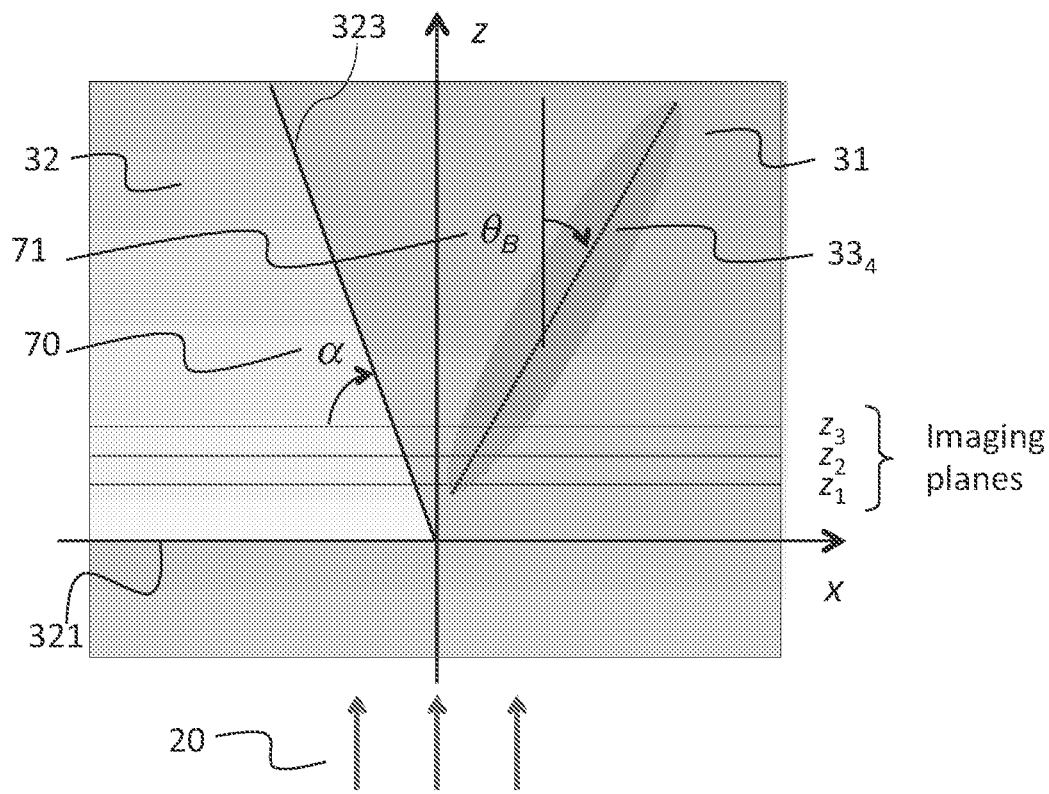
Figure 8:
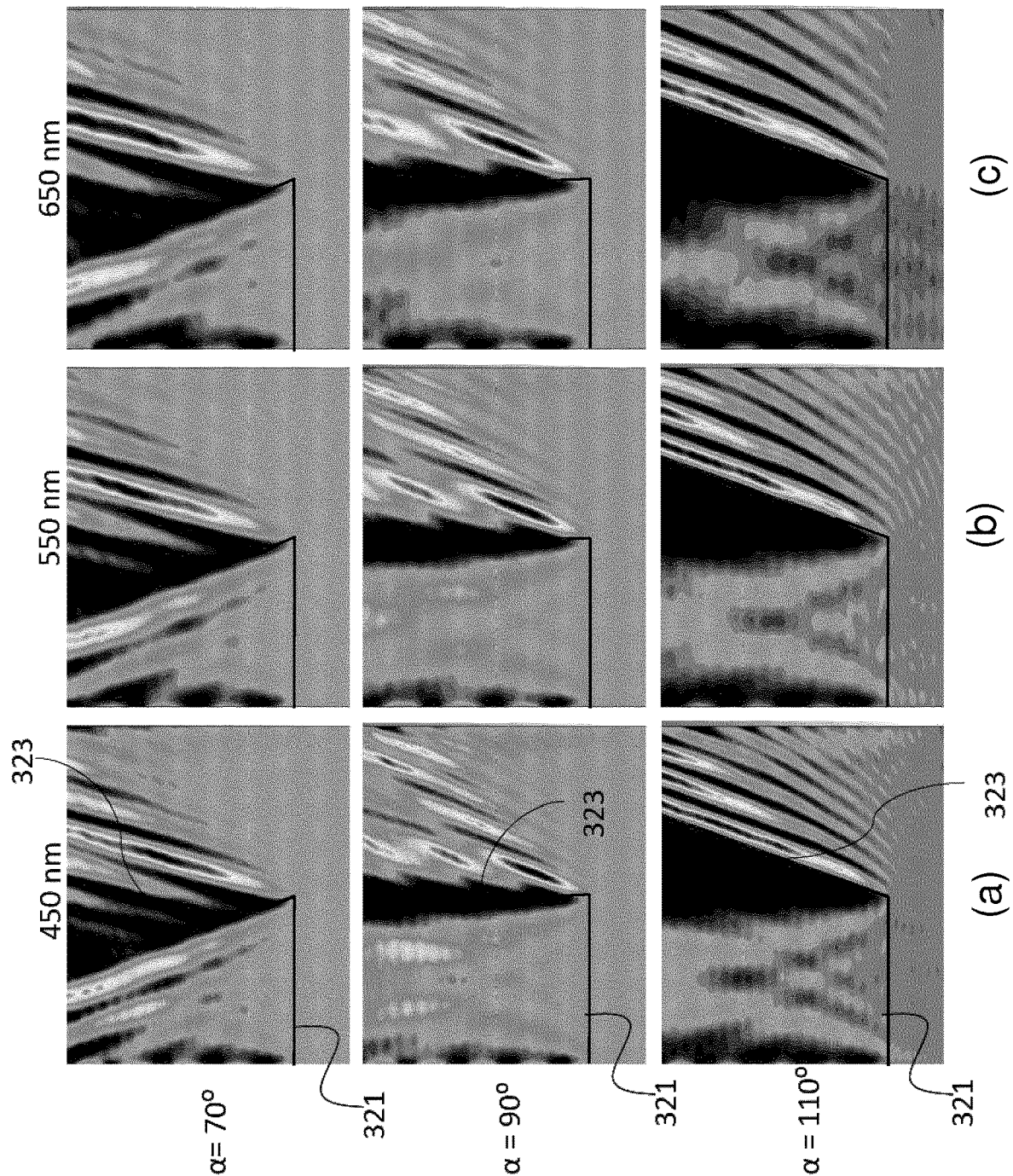
Figure 9:
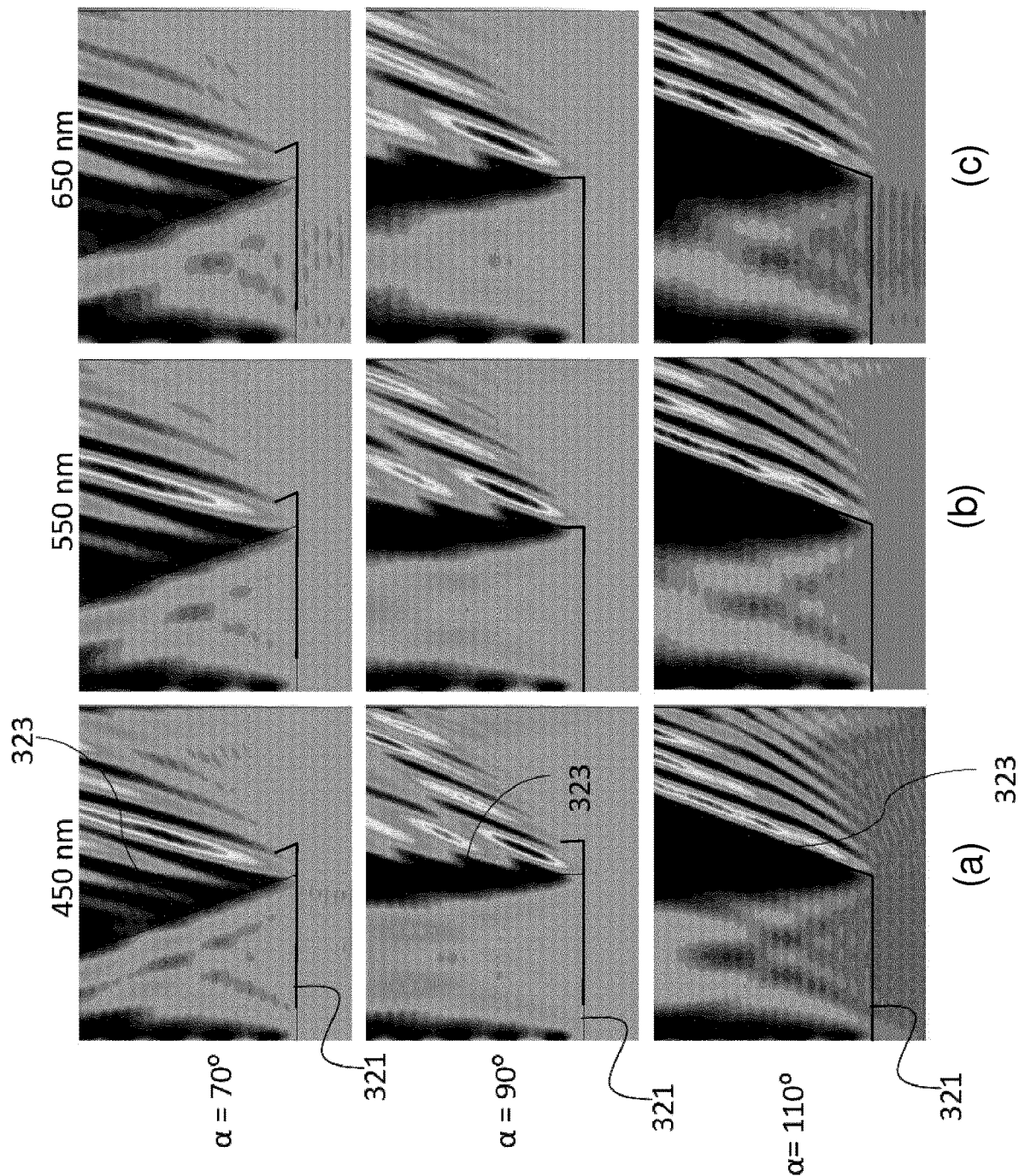
Figure 10A:
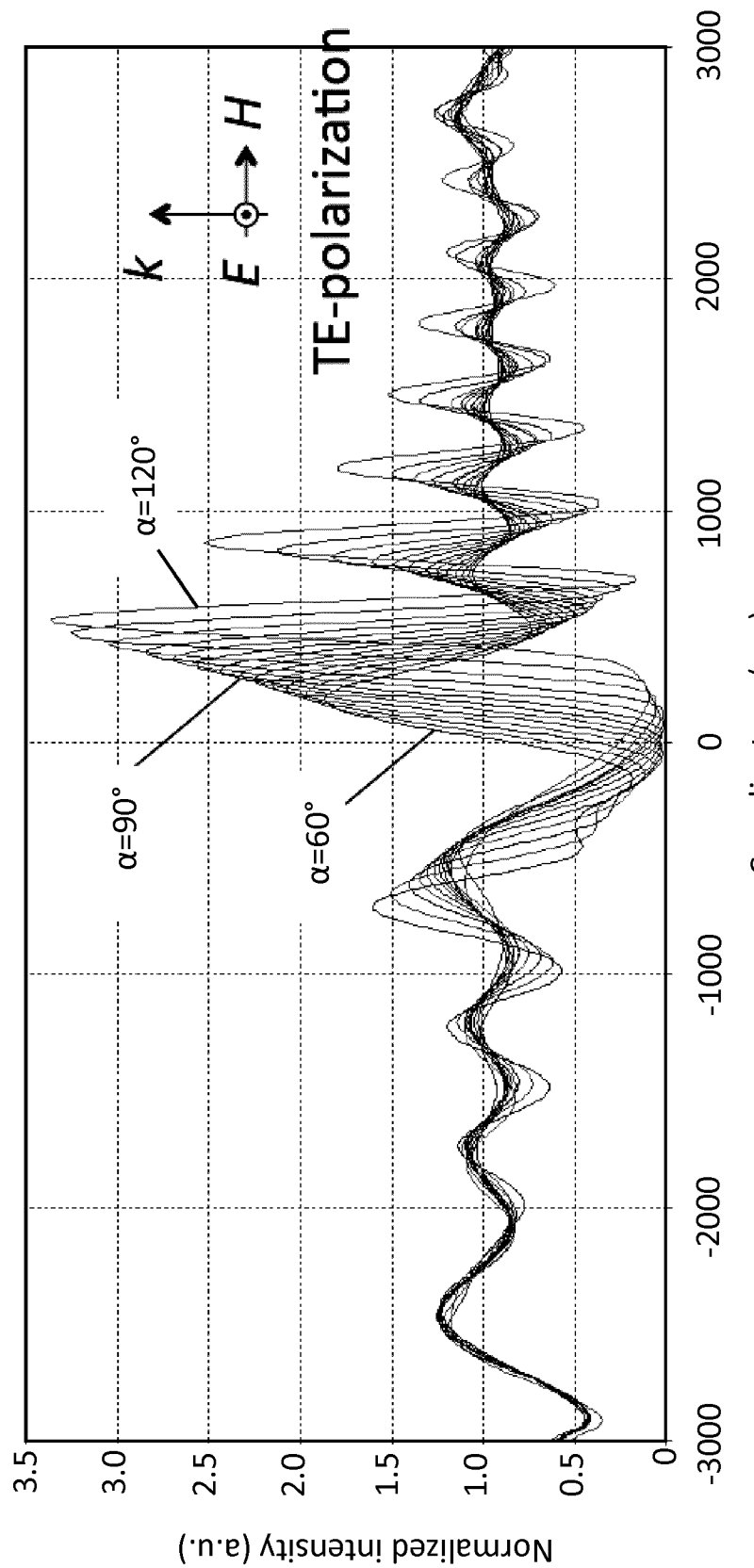
Figure 10B:
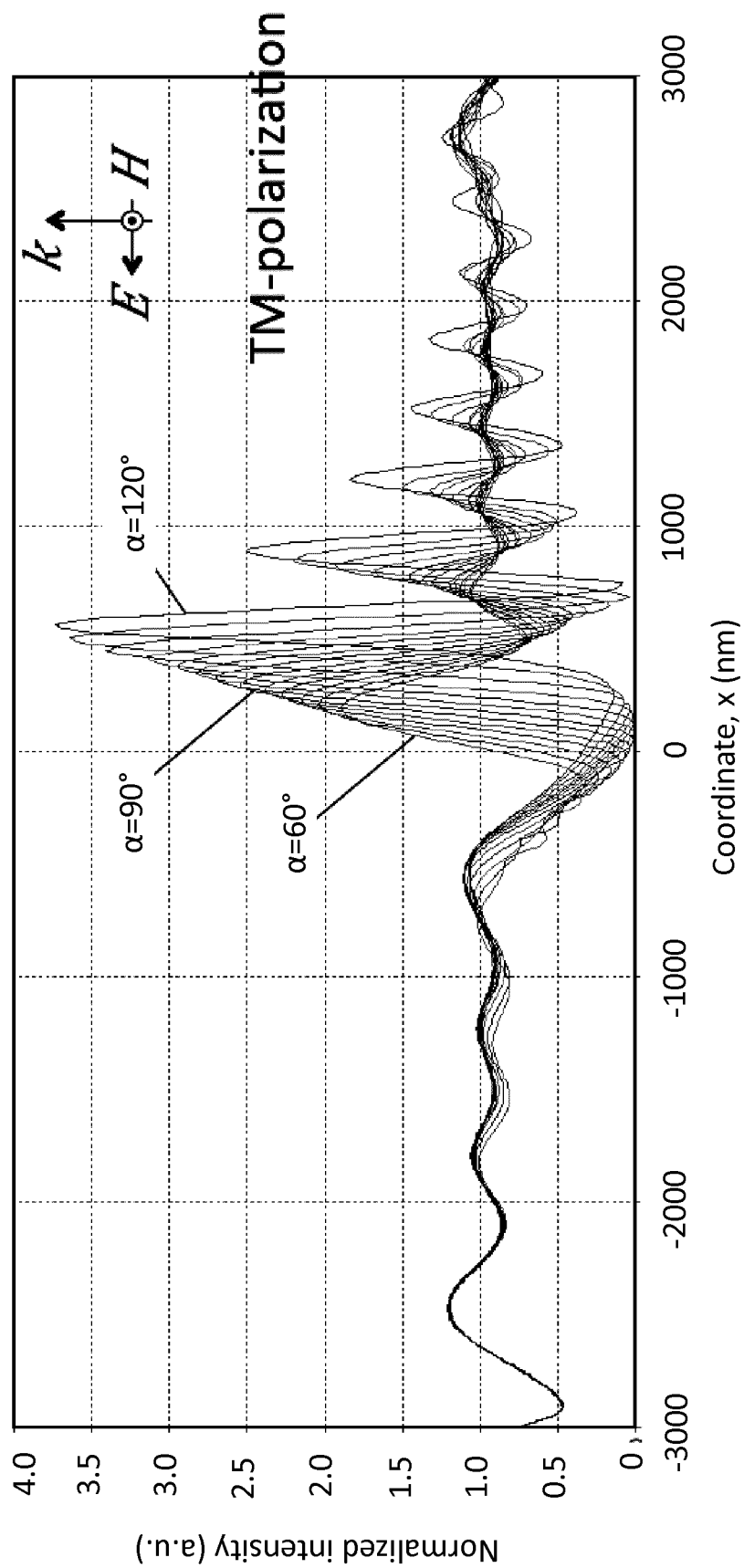
Figure 11:
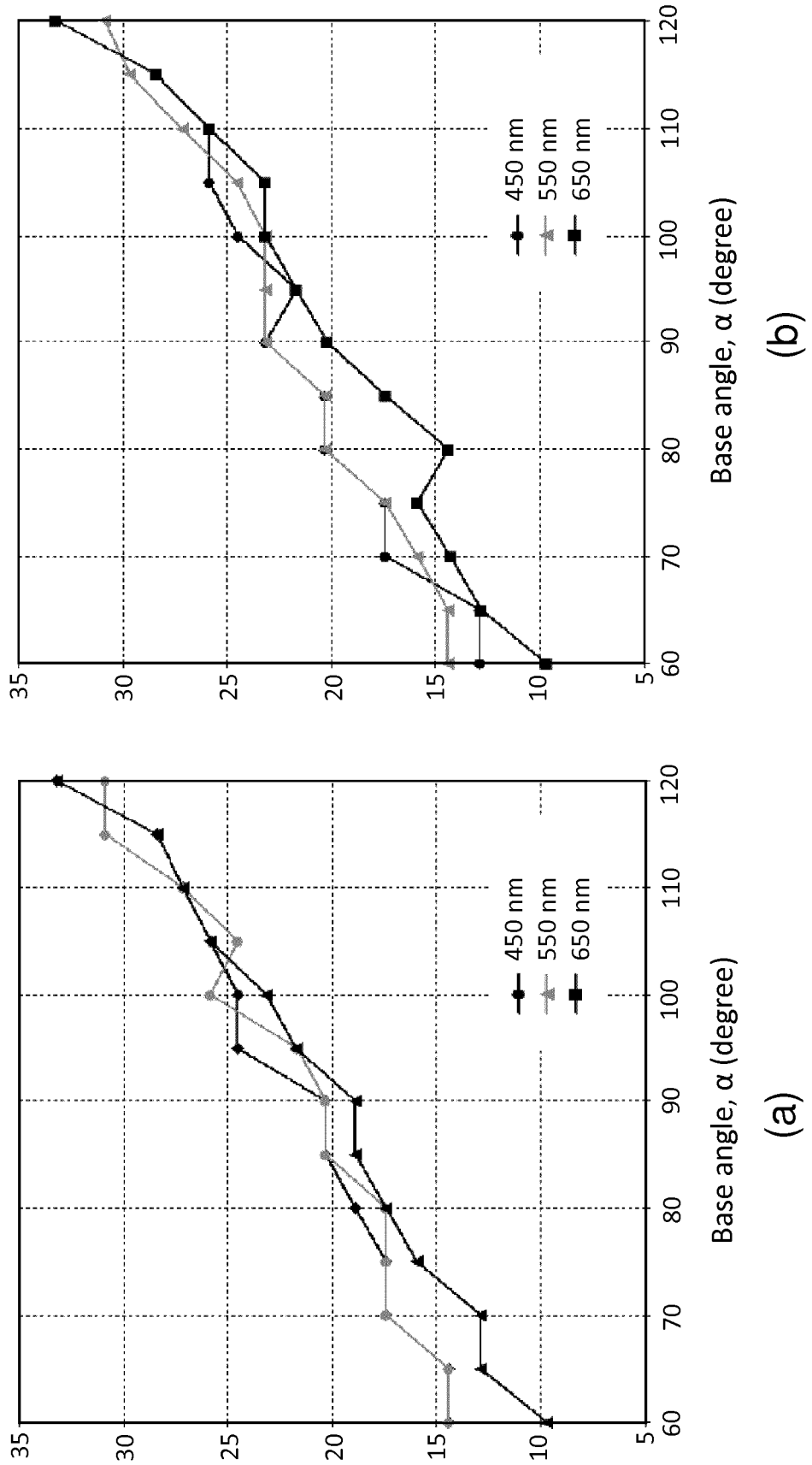
Figure 14:
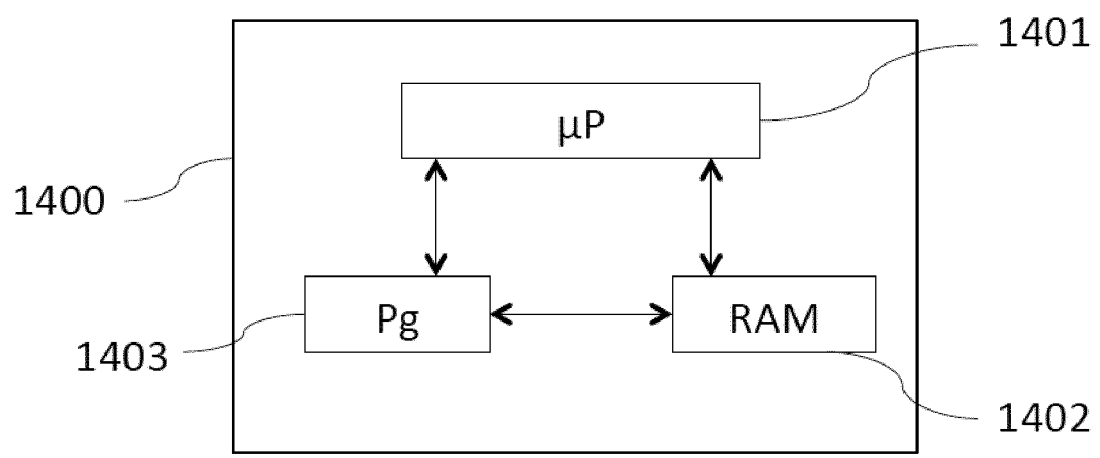

Embodiments of the present disclosure can be better understood with reference to the following description and drawings, given by way of example and not limiting the scope of protection, and in which:

FIGS. 1 (a), (b), (c), (d) and (e) relate to prior art techniques and are schematic drawings illustrating operational principles of refractive lenses, diffractive lenses, diffractive gratings, nanojet microlenses and terajet solid cuboid lenses;

FIG. 2(a) illustrates the topology of a hollow cylindrical cavity formed in a layer of dielectric material and producing a conical-type nanojet beam when illuminated by a plane wave from below, while FIG. 2(b) illustrates the normalized near-field power density distribution in the vertical xz-plane and FIG. 2(c) illustrates the normalized power density distribution in the horizontal xy-plane;

FIGS. 3A and 3B respectively show a 3D view and a top view of a device for forming a tilted focused beam in the near-zone according to an embodiment of the present disclosure;

FIGS. 4(a), (b) and (c) present normalized near-field power density distribution in horizontal and vertical planes for the nanojet microlens of FIG. 3 illuminated by a linearly polarized plane wave from below, at different wavelengths;

FIG. 5 presents the nanojet beam profile, as generated by the device of FIG. 3, along the x-axis (FIG. 5A) and along the y-axis (FIG. 5B);

FIG. 6 presents the peak power density in the nanojet beams produced by the convex and concave segments of the nanojet device with a crescent moon shape of FIG. 3;

FIG. 7 provides an alternate embodiment to FIG. 3, in which the device presents a variable base angle;

FIGS. 8(a) to 8(c) show the normalized field intensity patterns in xz-plane of the nanojet beam created by the device of FIG. 7, for different values of the base angle and different wavelengths of an incident TE-polarized plane wave;

FIGS. 9(a) to 9(c) show the normalized field intensity patterns in xz-plane of the nanojet beam created by the device of FIG. 7, for different values of the base angle and different wavelengths of an incident TM-polarized plane wave;

FIGS. 10(a) and 10(b) illustrate the normalized field intensity profiles in an imaging plane at z=750 nm for the device of FIG. 7 for different base angles when illuminated by a plane wave, which propagation direction coincides with the positive z-direction, respectively for a TE-polarized plane wave (FIG. 10(a)) and for a TM-polarized plane wave (FIG. 10(b));

FIGS. 11(a) and 11(b) illustrate the nanojet beam radiation angle with respect to the step base angle of the device of FIG. 7 for three different wavelengths, respectively for a TE polarization (FIG. 11(a)), and for a TM polarization (FIG. 11(b));

FIGS. 12(a) to 12(d) illustrate an alternate embodiment to the device of FIG. 3, according to which several devices with a crescent-moon shape are assembled in order to form a periodic S-type curved groove in a host dielectric medium;

FIGS. 13(a) to 13(c) illustrate a further alternate embodiment to the device of FIG. 3, according to which several devices with a crescent moon shape are assembled in order to form a cavity with a gear-type cross section;

FIG. 14 illustrates an example of a device that can be used to control performance of a device according to one embodiment of the disclosure.

The components in the figures are not necessarily to scale, emphasis instead being placed upon illustrating the principles of the invention.

5. DETAILED DESCRIPTION

The general principle of the present disclosure relies on the design of a new dielectric microstructure, which may be used for generating condensed low-dispersive optical beams in the near zone, also called nanojets, while simultaneously controlling their deviation. Its use is not limited to optical wavelengths. Presence of hollow cavities in the dielectric microstructure gives rise to a diffraction phenomenon, which is in turn coupled to refraction and interference phenomena, and allows generating condensed beam(s) of radiation in the near zone, with a controlled deviation, when the dielectric microstructure is illuminated by a plane wave, depending on the shape and dimensions of the structure.

The beam-forming and deviation function of such nanojet devices may be controlled by setting the cavity's base edge line length and curvature, as well as its base angle.

Such a general principle allows designing new focusing and beam-forming components, which can replace the conventional focusing devices in dense optic and photonic systems, like integrated optical sensors used in photo/video cameras that are essential components in the field of mobile technology (e.g. smartphones, tablets, AR and VR glasses).

Thanks to the ultra-compact dimensions of such dielectric microstructures, as well as to the wide range and diversity of field patterns, which can be produced through the use of such microstructures, the present disclosure finds applications in many fields of technology, including, but not limited to:

eyewear electronics, including AR and VR glasses;
optical sensors for photo/video/light field cameras;
light communication systems, including quantum computers;
bio/chemical sensors, including lab-on-chip sensors;
microscopy, spectroscopy and metrology systems;
integrated lens antennas for applications in the millimeter/sub-millimeter/infrared (IR) wavelength ranges.

The following discussion mostly focuses on optical applications and thus refers to material properties and fabrication methods relevant to nanoscale structures and wavelength. Nevertheless, the proposed design concepts can be easily scaled to other wavelength ranges, including microwaves, mm-waves, THz, IR, visible light and UV.

Inventors of the present disclosure have reached the conclusion that diffraction of a plane electromagnetic wave on the base surface of a dielectric material in the close vicinity of an abrupt change of level of this surface, also called a step, can result in the formation of condensed optical beams (so-called nanojets), when the surface on which diffraction occurs is in contact with a medium (material or gas) having a lower refractive index than that of the dielectric material. The number of beams and shape of each individual beam can be controlled by the variation of the step size and shape of the step edge line adjacent to the lateral and lower surfaces of the step. Unlike the well-known diffracted beams predicted by the Fresnel theory, the nanojet beams are low-dispersive (they show no or small wavelength dependence). Moreover, a same nanojet focusing component according to the present disclosure can produce multiple independent beams (having identical or non-identical shape) associated with different segments of the step edge line, which is not possible with Fresnel diffractive lenses. These unique features make the nanojet-based focusing components according to the present disclosure attractive for many today and future applications.

FIGS. 2(a) to 2(c) illustrate this general principle, according to which diffraction of a plane wave by a hollow cylindrical cavity as shown on FIG. 2(a), created in a dielectric host medium, results in the formation of a focused beam (i.e. nanojet), whose cross-section shape in the plane orthogonal to the incident wave propagation direction reproduces the shape of the cavity base edge line.

In FIG. 2(a), a hollow cylindrical cavity 22 with height H=740 nm and radius R=370 nm is created in a dielectric host medium 21 with refractive index $n_1$=1.5. The refractive index inside the hollow cavity 22 is $n_2$<$n_1$, $n_2$=1. The cavity 22 has a circular cross-section.

When a plane wave 20 is incident from below, the cavity 22 produces a hollow conical nanojet beam 23, whose opening angle (i.e. light deviation angle) depends on the index ratio between the media 22 inside and the media 21 outside the cavity. This phenomenon, as well as the shape of the nanojet beam thus produced is illustrated by FIGS. 2(b) and 2(c), which respectively show the normalized near-field power density distribution in the vertical xz-plane and the normalized power density distribution in the horizontal xy-plane at z=$z_0$=100 nm.

However, with such a hollow cylindrical cavity of circular cross-section, it is not possible to control the azimuth and elevation angle of the nanojet beam 23. Nonetheless, diffraction of light on a cavity, created in a dielectric host medium having refractive index $n_1$ and filled in with a dielectric material having refractive index $n_2$<$n_1$ can result in formation of a tilted nanojet beam, whose deviation angle (defined with respect to the incident wave propagation direction) can be predicted by the following equation:

$$\theta_B \approx \left(\frac{\pi}{2} - \theta_{TIR}\right)/2 \text{ where } \theta_{TIR} = \sin^{-1}\left(\frac{n_2}{n_1}\right) \quad (1)$$

is the critical angle for a diopter with indices $n_1$ and $n_2$.

Actually, the nanojet beam 23 is created as a result of the interference between a refracted wave, which is radiated outside the cavity 22 and the plane wave incident from below. As a consequence, the angle of radiation of the nanojet beam ($\theta_B$) is defined by a vector sum of these two waves. Moreover, the refraction angle of the wave radiated outward the cavity is close to the critical angle for the wave incident on the same boundary from outside: $\theta_1 \approx \theta_{TIR}$, since the main contribution to the formation of the planar wave front of the refracted wave outside the cavity comes from Huygens sources located close to the lateral edge of the cavity 22.

Moreover, the peak field intensity in the nanojet beam depends on the dimensions of the cavity, base angle, and curvature of its base edge line.

According to the present disclosure, and as illustrated by FIGS. 3A and 3B, a new type of nanojet microlens is hence introduced, whose shape resembles young moon, and which provides control over the azimuth and elevation angles of the focused nanojet beam.

FIG. 3A provides a 3D view of such a nanojet microlens with schematic illustration of the individual nanojet beams associated with different portions of the base edge line. A cylindrical cavity 32 is formed in a dielectric host medium 31 with refractive index $n_1$>$n_2$, where $n_2$ is the refractive index of the medium filling the cavity 32, for example air with $n_2$=1. More generally, the cavity can be filled in with any dielectric material (air, gas, glass, plastic, polymers, liquid . . . ) having a refractive index lower than that of the dielectric host medium 31. The base surface 321 of the cavity 32 is delineated by a base edge line 322, represented by a piecewise curve which comprises at least one convex part and at least one concave part. In FIG. 3A, the base edge line 322 comprises two line segments adjacent to the convex and concave surfaces of the cylindrical cavity 32. In this configuration, the convex segment of the base edge line 322 (formed by base edge line segments $322_1$, $322_2$, $322_3$, . . . ) produces a wide diverging beam of a conical type similar to the one shown in FIGS. 2(a) to 2(c), and comprising the nanojet beams $33_2$, $33_2$, $33_3$. The concave segment $322_4$ of the base edge line 322 acts like a focusing element producing a focused NJ beam $33_4$, which is formed thanks to the recombination of the NJ beams originating from different portions of the concave segment $322_4$ of the base edge line 322.

The radiation angle of the nanojet beam $33_4$, i.e. light deviation angle in the vertical (elevation) plane, is mainly defined by the index ratio at the boundary of the cavity 32. It also depends on the base angle of the cavity and, possibly, on the size/shape of the concave segment of its base surface edge line.

Orientation of the beam in the horizontal (azimuthal) plane can be varied by rotating the moon-like cavity around its vertical axis (i.e. z-axis in FIGS. 3A-3B). In this case, orientation of the nanojet beam in the horizontal plane can be characterized by an azimuth angle counted with respect to x-axis.

As illustrated in FIG. 3B, the lens with a crescent moon shape is created by superimposing (i.e. subtracting) two circular cylinders $34_1$, $34_2$ having the same height but different radii $R_1$ and $R_2$. The distance between both cylinders $34_1$, $34_2$ is a variable parameter W. In the following discussion, for sake of simplicity, it is assumed that $R_1=R_2=W$.

The following figures illustrate the results of full-wave 3D-FDTD (for "Finite Difference Time Domain") performed using the model of FIG. 3, computed using CST software (Computer Simulation technology v. 15).

More precisely, FIGS. 4(a) to 4(c) present normalized near-field power density distribution in horizontal and vertical planes for the microlens of FIG. 3 illuminated by a linearly polarized plane wave from below, at different wavelengths, namely $\lambda_0=450$ nm for FIG. 4(a), $\lambda_0=550$ nm for FIG. 4(b) and $\lambda_0=650$ nm for FIG. 4(c).

More precisely, the left images correspond to the simulated normalized power density distribution in xy-plane at $z=z_0$, and the right images in xz-plane at y=0.

The parameters of the structure are $n_1=1.5$, $n_2=1$, H=500 nm, $R_1=R_2=W=800$ nm. The imaging plane position is $z_0=900$ nm.

Figure 4:
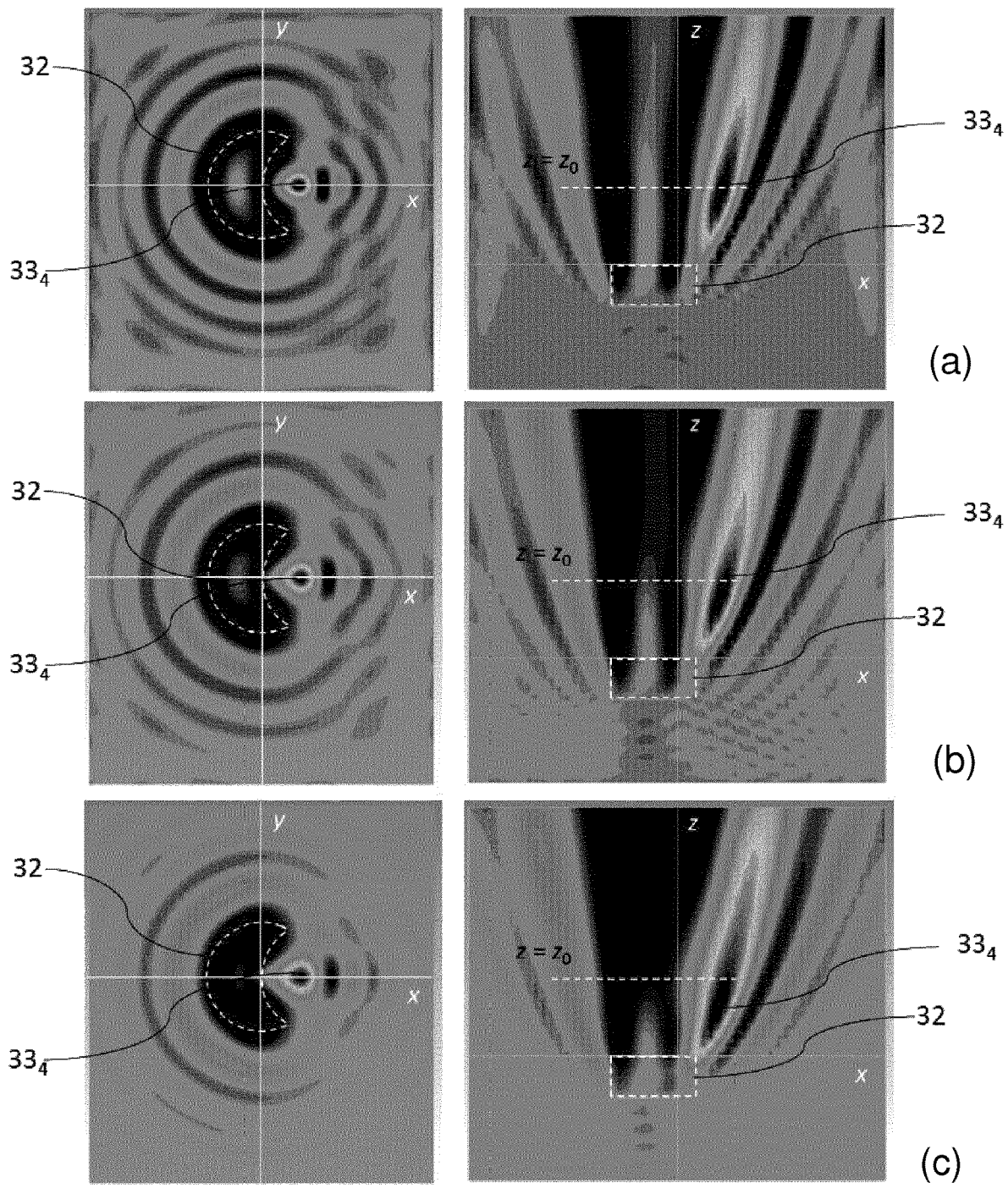

As may be observed in FIG. 4, the power density distribution in the near zone of a hollow cavity with a crescent moon shape agrees well with the theoretical model presented in FIG. 3. In particular, a tilted focused beam $33_4$ can be identified on the concave side of the cavity 32. The shape of the beam is well preserved from $\lambda_0=450$ nm to $\lambda_0=650$ nm.

FIG. 5 presents simulated near-field power density distribution in xy-plane (at $z=z_0$) along two lines parallel to x- and y-axes crossing at the point with a maximum power density as observed at $\lambda_0=550$ nm. Dimensions of the structure are the same as in FIG. 4, namely $n_1=1.5$, $n_2=1$, H=500 nm, $R_1=R_2=W=800$ nm. The imaging plane position is $z_0=900$ nm. More precisely, FIG. 5A illustrates the power density, expressed in mW/m$^2$, as a function of the x-coordinate, expressed in nm, for y=0 nm and $z_m=900$ nm, at three different wavelengths, namely 450 nm, 550 nm and 650 nm. FIG. 5B illustrates the power density, expressed in mW/m$^2$, as a function of the y-coordinate, expressed in nm, for $x_m=580$ nm and $z_m=900$ nm, at three different wavelengths, namely 450 nm, 550 nm and 650 nm. The beam full width at half maximum (FWHM) is about 480 nm in both planes.

FIG. 6 presents the peak power density (expressed in mW/m$^2$) in the nanojet beams produced by the convex (curve 62) and concave (curve 61) segments of the crescent moon-like nanojet device of FIG. 3, defined as a maximum power density in xz-plane for y<0 and y>0 respectively, as a function of the radius $R_1=R_2=W$ expressed in nanometers. As may be observed, a radius of 800 nm gives good performance. Two reference solutions are also shown, which correspond to the power density of a plane wave propagating in the same host medium (line 63) and to a nanojet beam produced by a straight edge of an infinite groove (line 64).

FIGS. 7 to 11 illustrate the existing relation between the cavity base angle of the nanojet device and the nanojet beam radiation angle.

FIG. 7 first gives some notations, which will be used thereafter. A cavity 32 is formed in a dielectric host medium 31. Cavity 32 comprises a base surface, or lower part, 321 and a lateral part 323, which forms a base angle 70 α with the base surface 321. The cavity 32 forms a step, i.e. an abrupt change of level in the dielectric host medium 31. It is considered in FIG. 7 that the step is infinite along y-direction, as compared to the wavelength of the incident electromagnetic wave 20. The cavity edge lines extend to infinity in the negative x- and positive z-directions, as compared to the wavelength.

A nanojet beam $33_4$ is produced by this step with base angle 70 α. It shows a radiation angle 71, noted as $\theta_B$, measured from the z axis.

FIGS. 8(a) to 8(c) show the normalized field intensity patterns in xz-plane of the nanojet beam created by the device of FIG. 7, for different values of the base angle 70 α and different wavelengths of the incident EM wave 20. It is considered that the incident EM wave 20 is a TE-polarized plane wave, and that the refractive index of the host medium is $n_1=1.5$. FIG. 8(a) shows the normalized field intensity pattern in xz-plane for a wavelength of the EM wave 20 $\lambda_0=450$ nm; FIG. 8(b) shows the normalized field intensity pattern in xz-plane for a wavelength of the EM wave 20 $\lambda_0=550$ nm; FIG. 8(c) shows the normalized field intensity pattern in xz-plane for a wavelength of the EM wave 20 $\lambda_0=650$ nm. The top row of images corresponds to a base angle 70 α=70°, the middle row of images corresponds to a base angle 70 α=90°, and the bottom row of images corresponds to a base angle 70 α=110°.

FIGS. 9(a) to 9(c) show the normalized field intensity patterns in xz-plane of the nanojet beam created by the device of FIG. 7, for different values of the base angle 70 α and different wavelength of the incident EM wave 20. It is now considered that the incident EM wave 20 is a TM-polarized plane wave, and that the refractive index of the host medium is $n_1=1.5$. FIG. 9(a) shows the normalized field intensity pattern in xz-plane for a wavelength of the EM wave 20 $\lambda=450$ nm; FIG. 9(b) shows the normalized field intensity pattern in xz-plane for a wavelength of the EM wave 20 $\lambda_0=550$ nm; FIG. 9(c) shows the normalized field intensity pattern in xz-plane for a wavelength of the EM wave 20 $\lambda_0=650$ nm. The top row of images corresponds to a base angle 70 α=70°, the middle row of images corresponds to a base angle 70 α=90°, and the bottom row of images corresponds to a base angle 70 α=110°.

As may be observed on FIGS. 8(a) to 8(c) and 9(a) to 9(c), the value of the base angle 70 α thus influences the radiation angle of the nanojet beam created by the step of the device of FIG. 7.

FIGS. 10(a) and 10(b) illustrate the normalized field intensity profiles in an imaging plane at z=750 nm for the device of FIG. 7 for different values of the base angle 70 α when illuminated by a plane wave, which propagation direction coincides with the positive z-direction, respectively for a TE-polarized plane wave (FIG. 10(a)) and for a TM-polarized plane wave (FIG. 10(b)). The refractive index of the host medium is $n_1=1.5$, and the wavelength of the incident wave is $\lambda_0=450$ nm. The x axis corresponds to the x coordinates expressed in cm.

FIGS. 11(a) and 11(b) illustrate the nanojet beam radiation angle θ expressed in degrees with respect to the step base angle 70 α, also expressed in degrees, for three different wavelengths, namely 450 nm, 550 nm and 650 nm. FIG. 11(a) corresponds to a TE polarization, and FIG. 11(b) corresponds to a TM polarization of the incident EM wave 20. The refractive index of the host medium is $n_1=1.5$.

In FIGS. 11(a) and (b), the nanojet beam radiation angle is defined as follows:

$$\theta = (\theta_1 + \theta_2)/2, \quad (2)$$

$$\theta_i = \operatorname{atan}\left(\frac{z_{i+1} - z_i}{x_{i+1} - x_i}\right), \quad (3)$$

where $x_i$ is x-coordinate of a point corresponding to the peak intensity value in a cut plane $z_i$, i=1,2,3, as shown in FIG. 7.

Based on the data reported in FIGS. 11(a) and (b), the nanojet radiation angle can be estimated as:

$$\theta \approx \theta_B + (\alpha - 90°)/3 \qquad (4)$$

where $\theta_B$ is the NJ radiation angle observed for the base angle α=90°. Moreover, the nanojet beam radiation for the right angle can be approximately defined by equation (1), as mentioned previously.

For the selected configuration of the cavity 32, the mismatch between Eq. (4) and the data extracted from the full-wave EM simulations does not exceed 3° for all values of the base angle 70 α.

The nanojet microlenses with crescent moon shape according to the present disclosure are near-zone focusing devices, which are used in association with other optical elements, such as focusing, beam-forming, light guiding or light capturing components. To increase their overall efficiency, it may be advantageous to use arrays of such nanojet elements, which may comprise from a few to several hundreds of cavities. These arrangements of moon-like nanojet microlenses can be created either on surface of the component tor inside the volume.

Hence, a device according to an embodiment of the present disclosure may comprise any number of cavities arranged in one plane (i.e. at a surface of a single plate) and placed far enough from each other to avoid electromagnetic coupling (i.e. at least a few wavelength in the host medium). Thanks to this, each microcavity will produce an independent nanojet beam, which parameters (FWHM and deviation angle) will depend on the parameters of the corresponding microcavity.

Multi-layers structures with two or more arrangements of nanojet microcavities arranged in different horizontal planes are also possible.

In some embodiments, it may be preferable to arrange the nanojet cavities so as to form an array, either with a regular or an irregular layout. Such an array may comprise any number of identical or non-identical cavities (in terms of size, shape and orientation). For instance, it can comprise identical nanojet cavities with a crescent moon shape with different orientation or an array of groups of nanojet cavities arranged in accordance to a determined pattern in order to produce a more complex optical function. This can be a certain near-field pattern or a larger-scale focused beam, produced as a result of recombination of independent nanojet beams associated with different microcavities, that extends beyond the near-zone of a single nanojet microlens.

The shape of the nanojet cavity can also be generalized towards a more complex structure comprising a set of moon-like elements combined together. Such a structure can be designed to produce a complex optical function, as discussed above, or for gaining additional degrees of freedom for near-field patterning and/or for simplifying the fabrication/assembly process.

Figure 12:
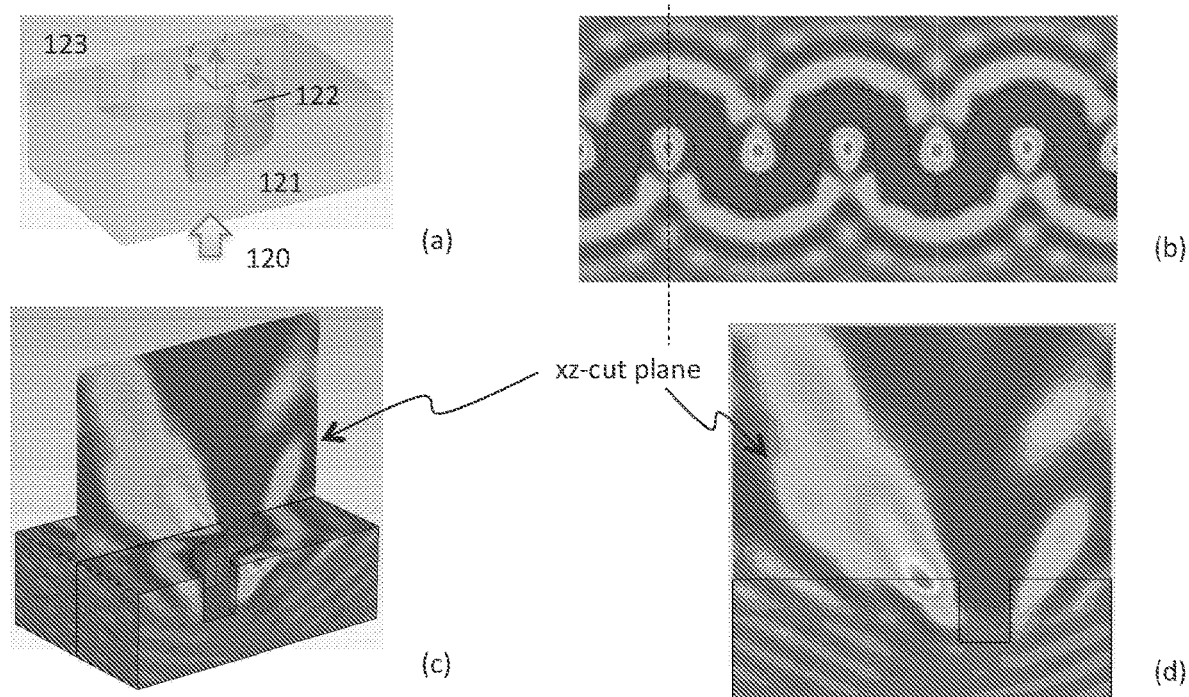
Figure 13:
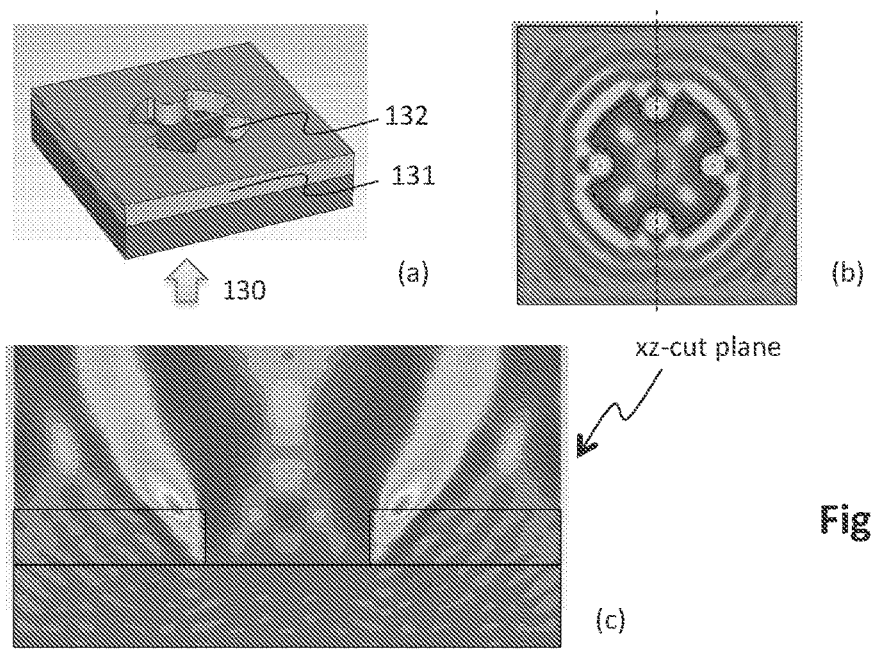

FIGS. 12 and 13 show possible examples of such arrangements of moon-like nanojet microlenses.

FIGS. 12(a) to 12(d) illustrate an alternate embodiment to the device of FIG. 3, according to which several devices with a crescent-moon shape are assembled in order to form a periodic S-type curved groove in a host dielectric medium.

FIG. 12(a) presents a perspective view of a dielectric plate 121, within which a generalized crescent moon like focusing element having a form of a periodic S-type curved groove 122 is created. More precisely, FIG. 12(a) shows the topology of a unit cell of such a periodic groove, placed in free space 123, and engraved at the surface of a dielectric substrate 121.

FIG. 12(b) illustrates the near-field intensity pattern in xy-plane at a close distance above the plate surface 121.

FIG. 12(c) provides a 3D view of the field intensity pattern of the unit cell of FIG. 12(a).

FIG. 12(d) illustrates the field intensity pattern in a 2D xz-plane crossing a nanojet beam.

In the embodiment of FIGS. 12(a) to 12(d), the host medium refractive index is $n_1$=1.5, the groove depth is H=500 nm, the groove width is W=400 nm and the wavelength of the EM incident wave 120 is $\lambda_0$=500 nm.

As detailed in FIGS. 12(a) and 12(b), the periodic S-type curved groove 122 is formed by a cavity that comprises at least one base surface, defined with respect to an arrival direction of said electromagnetic wave, and at least one lateral surface, and said at least one base surface is delineated by a base edge line which has portions, each portion having a U-shape or C-shape or a crescent moon-shape (depending of the viewing orientation), that comprises a concave base edge line segment and a convex base edge line segment.

FIGS. 13(a) to 13(c) illustrate a further alternate embodiment, according to which several devices with a crescent moon shape are assembled in order to form a cavity with a gear-type cross section with four identical concave segments, created in a double-layer dielectric plate.

More precisely, FIG. 13(a) illustrates the topology of such a gear-type cavity 132, created in a dielectric plate 131. FIG. 13(b) shows the near-field intensity pattern in xy-plane at a close distance above the plate 131 surface; FIG. 13(c) shows the field intensity pattern in xz-plane passing through the center of the cavity 132 and its concave segments. In the embodiment of FIGS. 13(a) to 13(c), the host medium refractive index $n_1$=1.5, and the dimensions of the cavity 132 are as follows: external radius $R_1$=1500 nm, radius of curvature of the concave parts $R_2$=400 nm, depth H=600 nm, groove width W=400 nm. The wavelength of the EM incident wave 130 is $\lambda_0$=532 nm.

As detailed in FIGS. 13(a) and 13(b), the gear-type cavity 132 comprises at least one base surface, defined with respect to an arrival direction of said electromagnetic wave, and at least one lateral surface, and said at least one base surface is delineated by a base edge line which has at least four portions that have a U-shape or C-shape or a crescent moon-shape (depending of the viewing orientation), that comprises a concave base edge line segment and a convex base edge line segment.

According to embodiments of the present disclosure, such devices embedding one or several cavities with a crescent moon shape in a dielectric microstructure can be fabricated using any established microfabrication technique, like molding (e.g. nanoimprinting) or photolithography.

According to an embodiment, such a component can take the form of a plate made of an optically transparent material (e.g. glass, plastic, polymer) with a microstructure formed on one of its surfaces. The plate can be planar or curved, flexible (bendable). The plate can be made of a single material or may comprise several layers. The former option is more suitable for resist-free molding fabrication methods, while the latter is more relevant to photolithography techniques.

In some embodiments, the plate with engraved microstructure can be attached to another component, e.g. another dielectric plate or a plano-convex lens. In such a case, the nanojet cavities may be formed on the external surface of the compound component, or at the interface between the two attached components.

Hence, the proposed component, in all its embodiments, can be, for instance, fabricated in the form of a thin film with perforated apertures attached to a glass plate or directly to a surface of another optical component, e.g. a plano-convex lens. It can also be covered with another layer of an optically-transparent media (e.g. another glass plate).

The film can be made of an optically transparent material, like PMMA (Acrylic), that is to be deposited directly on the surface of the supporting component (e.g. glass plate or lens). For instance, this can be done by spin-coating that enables deposition of thin nanofilms with the desired thickness (order of a few hundred nanometers).

The apertures (that will serve as hollow cuboids) can then be created, for instance, using the optical or e-beam lithography technology.

The periodic structures can be, potentially, fabricated using the maskless interference lithography that is faster and cheaper than standard optical lithography.

In an alternate embodiment, the cavities with a crescent moon shape can be fabricated using nanoimprinting or replica molding methods in an optically transparent material, e.g. soft organic polymer such as PDMS, and then attached to a surface of a glass plate acting as a support.

FIG. 14 presents an example of a device that can be used to control the performance of a device according to one embodiment of the disclosure.

Such a device referenced 1400 comprises a computing unit (for example a CPU, for "Central Processing Unit"), referenced 1401, and one or more memory units (for example a RAM (for "Random Access Memory") block in which intermediate results can be stored temporarily during the execution of instructions a computer program, or a ROM block in which, among other things, computer programs are stored, or an EEPROM ("Electrically-Erasable Programmable Read-Only Memory") block, or a flash block) referenced 1402. Computer programs are made of instructions that can be executed by the computing unit. Such a device 1400 can also comprise a dedicated unit, referenced 1403, constituting an input-output interface to allow the device 1400 to communicate with other devices. In particular, this dedicated unit 1403 can be connected with an antenna (in order to perform communication without contacts), with light source/receiving unit (such as for example a photodiode, optical fiber, detector, e.g. photodiode, etc.) or with serial ports (to carry communications "contact"). It should be noted that the arrows in FIG. 14 signify that the linked units can for example exchange data together through buses.

In an alternate embodiment, control of the performance of a device according to one embodiment of the disclosure can be implemented in hardware in a programmable FPGA ("Field Programmable Gate Array") component or ASIC ("Application-Specific Integrated Circuit") component.

The invention claimed is:

1. A device for forming at least one tilted focused beam in a near-field zone from an electromagnetic wave incident on the device,
    the device comprising at least one layer of dielectric material comprising at least one cavity, the at least one cavity being filled in with a medium having a refractive index lower than a refractive index of the dielectric material;
    wherein the at least one cavity is approximately cylindrical or cone-shaped and comprises at least one base surface, defined with respect to an arrival direction of the electromagnetic wave, and at least one lateral surface;
    wherein the at least one base surface is delineated by a base edge line that has a shape of a crescent moon, comprising a concave base edge line segment and a convex base edge line segment;
    wherein the shape and/or orientation and/or associated base angles between the at least one base surface and the at least one lateral surface controls an angular position of a projection of the at least one focused beam on a plane orthogonal to the arrival direction of the electromagnetic wave, wherein said tilted focused beam is formed by a recombination of nanojet beams originating from different portions of said concave base edge line.

2. The device for forming at least one tilted focused beam in a near-field zone according to claim 1, wherein a ratio between the refractive index of the medium filling the at least one cavity and the refractive index of the dielectric material contributes to controlling an angular position of a projection of the at least one focused beam in a vertical plane.

3. The device for forming at least one tilted focused beam in a near-field zone according claim 1, wherein the at least one cavity belongs to at least one set of at least two cavities.

4. The device for forming at least one tilted focused beam in a near-field zone according to claim 3, wherein the at least two cavities in the set are at least partly merged to form at least one arrangement of cavities.

5. The device for forming at least one tilted focused beam in a near-field zone according to claim 1, further comprising at least one layer forming a substrate abutting the at least one layer of dielectric material.

6. The device for forming at least one tilted focused beam in a near-field zone according to claim 5, further comprising at least one layer forming a superstrate, the at least one layer of dielectric material being located between the substrate and the superstrate.

7. The device for forming at least one tilted focused beam in a near-field zone according to claim 6, wherein the substrate and the superstrate are made of the same dielectric material as the at least one layer of dielectric material.

8. The device for forming at least one tilted focused beam in a near-field zone according to claim 1, wherein the dielectric material forming the at least one layer of dielectric material is selected from the group consisting of glass, plastic, a polymer material, an organic or inorganic optically transparent electrically conducting material, and ceramics.

9. The device for forming at least one tilted focused beam in a near-field zone according to claim 6, wherein a material of the superstrate is selected from the group consisting of glass, plastic, a polymer material, an organic or inorganic optically transparent electrically conducting material, a semiconductor material, a liquid, a gas, and a gel.

10. The device for forming at least one tilted focused beam in a near-field zone according to claim 5, wherein a material of the substrate is selected from the group consisting of glass, plastic, a polymer material, an organic or inorganic optically transparent electrically conducting material, a semiconductor material, a liquid, a gas, and a gel.

11. The device for forming at least one tilted focused beam in a near-field zone according to claim 1, wherein the medium having a refractive index lower than the refractive index of the dielectric material belongs to the group consisting of glass, plastic, a liquid, a gas, and a gel.

12. The device for forming at least one tilted focused beam in a near-field zone according to claim 1, wherein a direction of the tilted focused beam is different from a direction of the incident electromagnetic wave.

13. The device for forming at least one tilted focused beam in a near-field zone according to claim 1, wherein at least part of the at least one base surface is disposed in the-plane orthogonal to the arrival direction of the electromagnetic wave.

14. A device for forming at least one tilted focused beam in a near-field zone from an electromagnetic wave incident on the device, the device comprising at least one layer of dielectric material in which at least one cavity is disposed, wherein the at least one cavity is filled with a medium having a refractive index lower than a refractive index of the dielectric material;

wherein the at least one cavity is approximately cylindrical or cone-shaped and comprises at least one base surface, defined with respect to an arrival direction of the electromagnetic wave, and at least one lateral surface;

wherein the at least one base surface is delineated by a base edge line that has a shape of a crescent moon, comprising a concave base edge line segment and a convex base edge line segment;

wherein the shape and/or orientation and/or associated base angles between the at least one base surface and the at least one lateral surface controls an angular position of a projection of the at least one focused beam on a plane orthogonal to the arrival direction of the electromagnetic wave, wherein the tilted focused beam is formed by a recombination of nanojet beams originating from different portions of said concave base edge line.

15. The device according to claim 14, wherein a direction of the tilted focused beam is different from a direction of the incident electromagnetic wave.

16. The device according to claim 14, wherein at least part of the at least one base surface is disposed in the-plane orthogonal to the arrival direction of the electromagnetic wave.

17. The device according to claim 14, wherein a ratio between the refractive index of the medium filling the at least one cavity and the refractive index of the dielectric material contributes to controlling an elevation angle of the at least one focused beam.

18. The device according to claim 14, wherein the dielectric material forming the at least one layer of dielectric material is selected from the group consisting of glass, plastic, a polymer material, an organic or inorganic optically transparent electrically conducting material, and ceramics.

* * * * *

UNITED STATES PATENT AND TRADEMARK OFFICE
CERTIFICATE OF CORRECTION

PATENT NO. : 11,275,252 B2
APPLICATION NO. : 16/342036
DATED : March 15, 2022
INVENTOR(S) : Artem Boriskin, Valter Drazic and Laurent Blonde It is certified that error appears in the above-identified patent and that said Letters Patent is hereby corrected as shown below:

On the Title Page

Item (72): Replace "Thorignë-Fouillard" with --Thorigné-Fouillard--

In the Claims

Claim 13, Column 19, Line 8: Replace "the-plane" with --the plane--

Claim 16, Column 20, Line 14: Replace "the-plane" with --the plane--

Signed and Sealed this
Third Day of September, 2024

Katherine Kelly Vidal
*Director of the United States Patent and Trademark Office*